(12) United States Patent
Masu et al.

(10) Patent No.: US 11,616,743 B2
(45) Date of Patent: Mar. 28, 2023

(54) INFORMATION SHARING SYSTEM AND INFORMATION SHARING METHOD

(71) Applicant: HONDA MOTOR CO., LTD., Tokyo (JP)

(72) Inventors: Shintaro Masu, Tokyo (JP); Shota Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 17/376,431

(22) Filed: Jul. 15, 2021

(65) Prior Publication Data

US 2022/0038401 A1 Feb. 3, 2022

(30) Foreign Application Priority Data

Jul. 28, 2020 (JP) .............................. JP2020-127313

(51) Int. Cl.
| | |
|---|---|
| *G06Q 50/00* | (2012.01) |
| *H04L 51/046* | (2022.01) |
| *H04L 51/10* | (2022.01) |
| *H04L 65/403* | (2022.01) |
| *B60K 35/00* | (2006.01) |
| *H04L 51/52* | (2022.01) |

(52) U.S. Cl.
CPC ............ *H04L 51/046* (2013.01); *B60K 35/00* (2013.01); *G06Q 50/01* (2013.01); *H04L 51/10* (2013.01); *H04L 51/52* (2022.05); *H04L 65/403* (2013.01); *B60K 2370/563* (2019.05); *B60K 2370/5911* (2019.05); *B60K 2370/782* (2019.05)

(58) Field of Classification Search
CPC ....... H04L 51/046; H04L 51/52; H04L 51/10; H04L 65/403; G06F 3/167; G09G 2380/10; G06T 13/80; B60K 35/00; B60K 2370/782; B60K 2370/5911; B60K 2370/563; G06Q 50/01
See application file for complete search history.

(56) References Cited

U.S. PATENT DOCUMENTS 7,328,242 B1 * 2/2008 McCarthy .............. G06Q 10/10
709/204
7,752,251 B1 * 7/2010 Shuster ................. G06F 16/954
709/200

(Continued)

FOREIGN PATENT DOCUMENTS

JP 2010-205278 9/2010

*Primary Examiner* — Anthony Mejia
*Assistant Examiner* — Hassan A Khan
(74) *Attorney, Agent, or Firm* — Rankin, Hill & Clark LLP

(57) ABSTRACT

An information sharing system includes a processor that receives and stores a post from a user group, outputs content of the post to a terminal device of a user, receives a joining request regarding synchronous output of the content, from the user, and acquires specification of a joining mode of the terminal device in the synchronous output, the processor makes, based on a reproduction operation in the terminal device of the user from whom the joining request is received, the terminal devices of all the users from whom the joining request is received synchronously output the content, establishes communication between the terminal device and equipment of a vehicle when the specification of a driver mode is acquired as the joining mode, and outputs the content to the equipment.

6 Claims, 19 Drawing Sheets

(56) References Cited

U.S. PATENT DOCUMENTS

| | | | | |
|---|---|---|---|---|
| 10,643,477 B2* | 5/2020 | Hodges | | G07C 5/008 |
| 11,169,770 B1* | 11/2021 | Venti | | H04L 67/146 |
| 2009/0013048 A1* | 1/2009 | Partaker | | H04G 5/54 |
| | | | | 709/206 |
| 2009/0193138 A1* | 7/2009 | Capps | | H04L 51/046 |
| | | | | 709/206 |
| 2010/0137036 A1* | 6/2010 | Bucher | | H04M 1/2757 |
| | | | | 455/566 |
| 2011/0170547 A1* | 7/2011 | Fein | | H04L 45/126 |
| | | | | 370/392 |
| 2013/0030644 A1* | 1/2013 | Kemmerer | | H04N 21/42204 |
| | | | | 701/1 |
| 2013/0330019 A1* | 12/2013 | Kim | | G06T 11/60 |
| | | | | 382/298 |
| 2014/0095000 A1* | 4/2014 | Waller | | G09G 5/14 |
| | | | | 701/1 |
| 2014/0095639 A1* | 4/2014 | Noma | | H04L 12/1822 |
| | | | | 709/206 |
| 2014/0145933 A1* | 5/2014 | Chae | | G06F 3/017 |
| | | | | 345/156 |
| 2014/0173430 A1* | 6/2014 | Clavel | | G06F 3/0481 |
| | | | | 715/716 |
| 2014/0359456 A1* | 12/2014 | Thiele | | H04W 4/18 |
| | | | | 715/735 |
| 2015/0015479 A1* | 1/2015 | Cho | | G06F 3/1423 |
| | | | | 345/156 |
| 2016/0021047 A1* | 1/2016 | Sawato | | H04W 4/029 |
| | | | | 455/456.3 |
| 2016/0026943 A1* | 1/2016 | Gore | | G06F 3/0481 |
| | | | | 705/7.27 |
| 2016/0112354 A1* | 4/2016 | Krantz | | H04L 67/14 |
| | | | | 709/206 |
| 2016/0176372 A1* | 6/2016 | Kim | | E05F 15/73 |
| | | | | 701/49 |
| 2016/0205197 A1* | 7/2016 | Yasrebi | | H04L 67/14 |
| | | | | 709/204 |
| 2017/0302613 A1* | 10/2017 | Imbrie | | H04L 51/226 |
| 2018/0027374 A1* | 1/2018 | Wang | | H04W 4/021 |
| | | | | 455/456.3 |
| 2018/0093611 A1* | 4/2018 | Kim | | B60K 35/00 |
| 2018/0130449 A1* | 5/2018 | Jeon | | H04L 63/105 |
| 2018/0201207 A1* | 7/2018 | Kim | | B60R 1/006 |
| 2018/0321843 A1* | 11/2018 | Giannotti | | G06F 3/04845 |
| 2019/0349326 A1* | 11/2019 | Heikes | | G06Q 10/10 |
| 2020/0286450 A1* | 9/2020 | Furuya | | G06T 13/00 |
| 2020/0411012 A1* | 12/2020 | Baba | | G10L 17/22 |
| 2021/0179117 A1* | 6/2021 | Glazman | | G06V 40/10 |
| 2021/0181910 A1* | 6/2021 | Brockmole | | B60K 37/02 |
| 2021/0214990 A1* | 7/2021 | Morosawa | | E05B 81/16 |

* cited by examiner

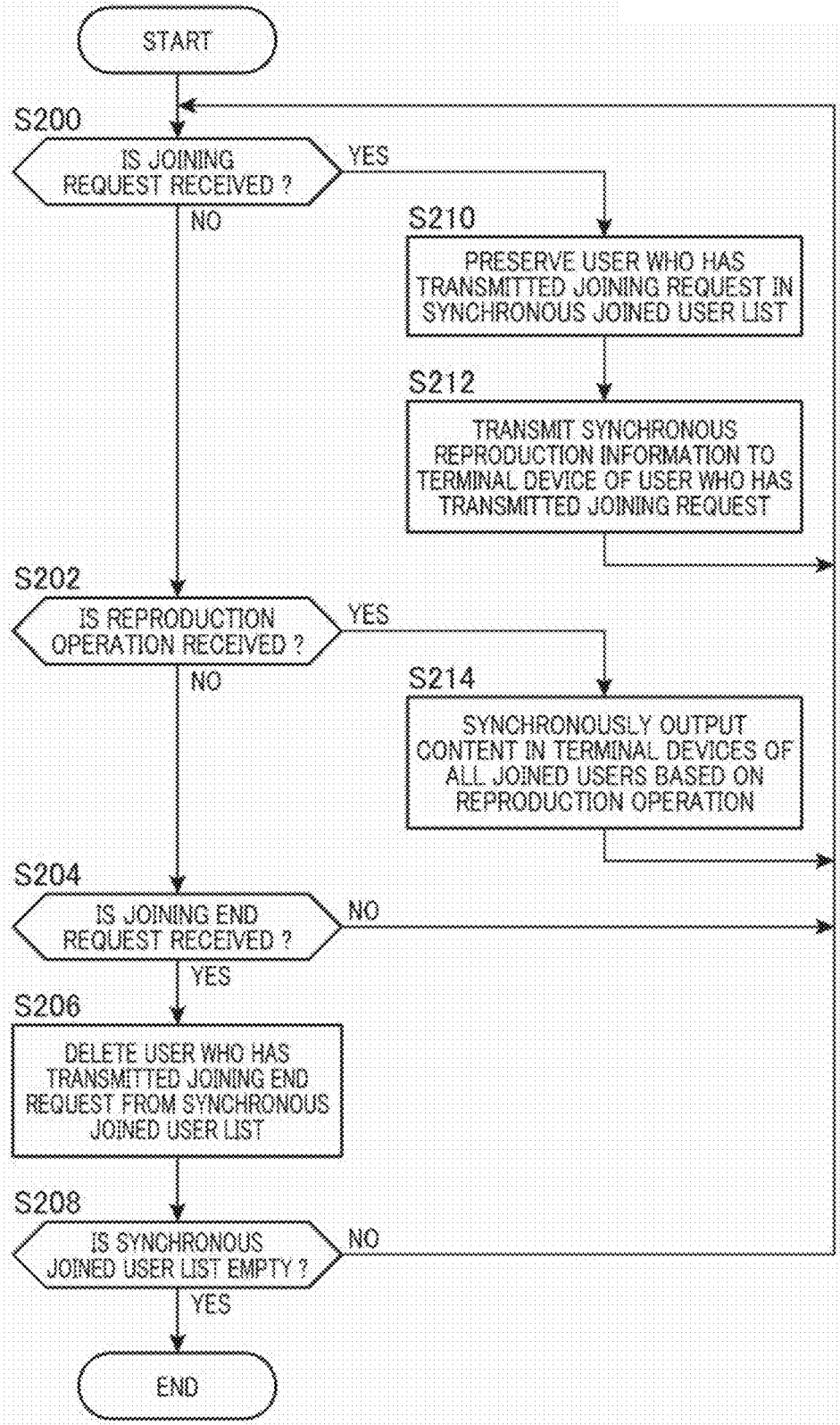

INFORMATION SHARING SYSTEM AND INFORMATION SHARING METHOD

INCORPORATION BY REFERENCE

The present application claims priority under 35 U.S.C. § 119 to Japanese Patent Application No. 2020-127313 filed on Jul. 28, 2020. The content of the application is incorporated herein by reference in its entirety.

BACKGROUND OF THE INVENTION

Field of the Invention

The present invention relates to an information sharing system capable of sharing various kinds of information such as music content included in a post from a user among a plurality of users.

Description of the Related Art

When a plurality of persons such as friends arrange to go on a travel or the like, for example, music reproduced in a vehicle when moving is connected with various memories of a destination, a moving route or members riding together or the like, and is remembered by each person as a memory shared by the persons. However, when the users traveling together move separately in a plurality of vehicles for example, even though the persons in the same vehicle can share an experience of emotional uplift or the like when moving, it is difficult for all the persons traveling together to equally share the experience of the emotional uplift or the like when moving among persons on the plurality of vehicles.

Conventionally, a system is known which is intended to enable a plurality of users at respective locations away from each other to communicate with each other in a strong feeling of experiencing the same situation and is configured to transmit music data for reproduction of music requested by one user to terminal devices of all the users (Japanese Patent Laid-Open No. 2010-205278).

In the conventional technology, since data for reproduction of a same musical piece is transmitted to the terminal devices of the plurality of users, each user can recognize that another user is requesting the musical piece, and can reproduce the musical piece if the user wants to listen to it. However, since the musical piece is reproduced by decision of each user, the experience of the entire users is not always shared depending on reproduction timing of each user.

The present invention is implemented in consideration of the background described above, and is to, in reproduction of content of music or the like based on a post from a user, promote sharing of an experience among a plurality of users related to the content reproduction and improve oneness of the shared experience.

SUMMARY OF THE INVENTION

One aspect of the present invention is an information sharing system including: a post reception unit configured to receive and store a post from a user configuring a user group; a content reproduction unit configured to output content of the received post to a terminal device of the user of the user group; a joining request reception unit configured to receive a joining request regarding synchronous output of the content, from the user of the user group; and a joining mode acquisition unit configured to acquire specifying (specification/designation) of a joining mode which is an operation mode of the terminal device in the synchronous output, from the user, the content reproduction unit makes, based on a reproduction operation regarding the content in the terminal device of any of the users from whom the joining request is received, the terminal devices of all the users from whom the joining request is received synchronously output the content which is an object of the reproduction operation, and the joining mode acquisition unit establishes communication between the terminal device of the user and equipment of a vehicle when the specifying of a driver mode meaning joining the synchronous output as a driver user who is a driver of the vehicle is acquired as the joining mode, and outputs the content from the terminal device of the user to the equipment of the vehicle.

According to another aspect of the present invention, the joining mode acquisition unit makes the terminal device acquire input from a steering switch provided on a steering wheel of the vehicle as the reproduction operation regarding the content, when the specifying of the driver mode is acquired.

According to another aspect of the present invention, the joining mode acquisition unit inhibits output of the content from the terminal device of the user when the specifying of a passenger mode meaning joining the synchronous output as a passenger user who is a passenger of the vehicle is acquired as the joining mode.

According to another aspect of the present invention, the terminal device of the user whose joining request is not received by the joining request reception unit performs the reproduction operation of the content included in the post independent of the terminal devices of the other users.

According to another aspect of the present invention, the content includes music, moving images, maps or photographs.

According to another aspect of the present invention, the information sharing system includes a thread generation unit configured to generate a thread which is a virtual storage space to preserve posts from users belonging to the user group by an instruction from the user, and the user group is a group of joined users configured by a generation user who has instructed generation of the thread and invited users invited to perform posting by the generation user.

Another aspect of the present invention is an information sharing method including: a step of receiving and storing a post from a user configuring a user group; a step of outputting content of the received post to a terminal device of a user of the user group; a step of receiving a joining request regarding synchronous output of the content, from the user of the user group; and a step of acquiring specifying of a joining mode which is an operation mode of the terminal device in the synchronous output, from the user, the terminal devices of all the users from whom the joining request is received are made to, based on a reproduction operation regarding the content in the terminal device of any of the users from whom the joining request is received, synchronously output the content which is an object of the reproduction operation, in the outputting step, and communication between the terminal device of the user and equipment of a vehicle is established and the content is outputted from the terminal device of the user to the equipment of the vehicle when the specifying of a driver mode meaning joining the synchronous output as a driver user who is a driver of the vehicle is acquired as the joining mode, in the acquiring step.

According to the aspects of the present invention, in reproduction of content of music or the like based on a post from a user, sharing of an experience among a plurality of users related to the content reproduction can be promoted and oneness of the shared experience can be improved.

BRIEF DESCRIPTION OF THE DRAWINGS

FIG. 19 is a flowchart illustrating a procedure of synchronous reproduction processing of the information sharing system illustrated in FIG. 1.

DETAILED DESCRIPTION OF THE PREFERRED EMBODIMENTS

Figure 1:
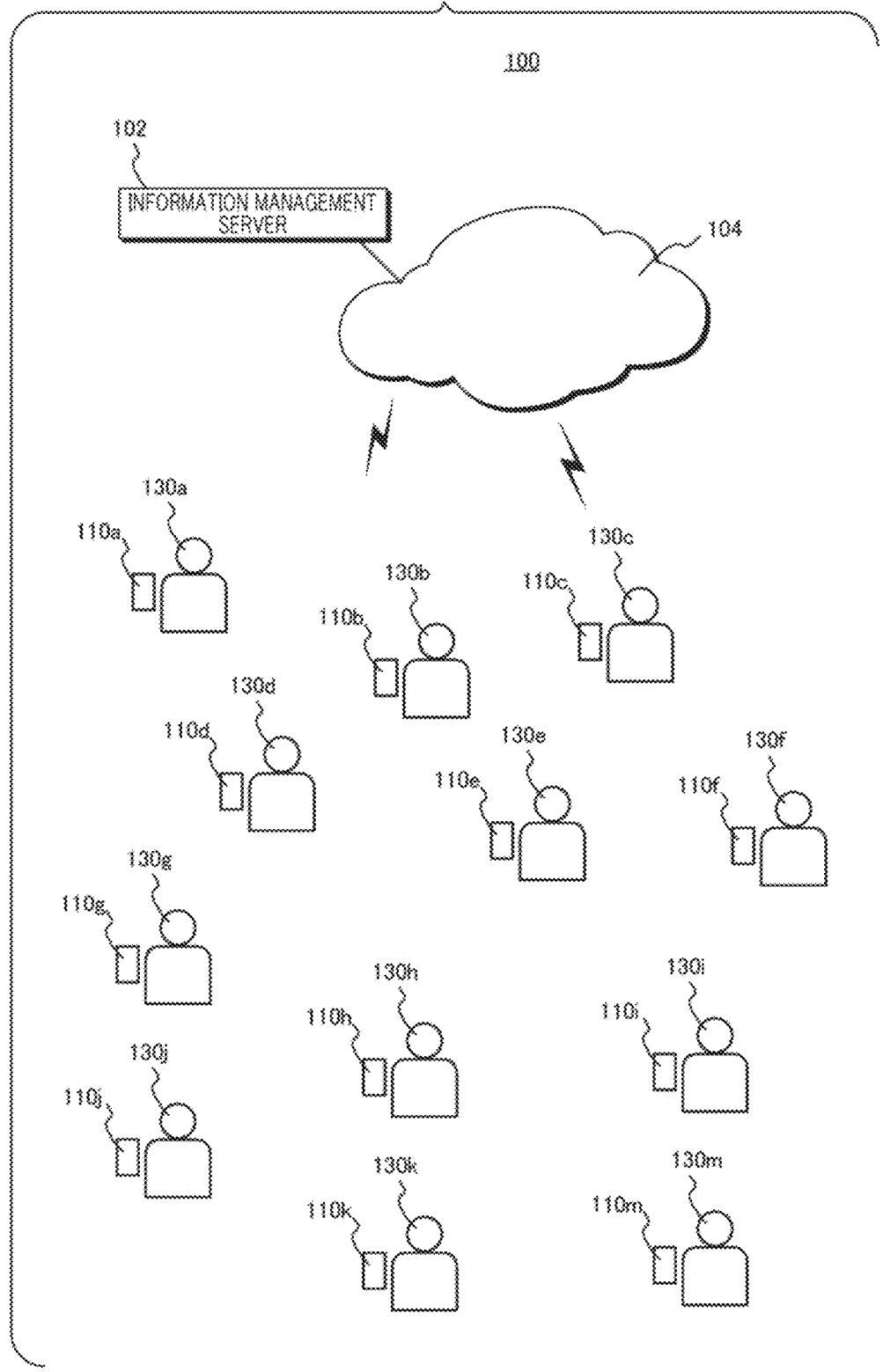
FIG. 1 is a diagram illustrating an example of a configuration of an information sharing system relating to one embodiment of the present invention.

Hereinafter, one embodiment of the present invention will be described with reference to the drawings. FIG. 1 is a diagram illustrating a configuration of an information sharing system relating to one embodiment of the present invention. An information sharing system 100 relating to the present embodiment is configured by an information management server 102, and terminal devices 110a, 110b, 110c, 110d, 110e, 110f, 110g, 110h, 110i, 110j, 110k and 110m (generically referred to also as terminal devices 110, hereinafter) of users 130a, 130b, 130c, 130d, 130e, 130f, 130g, 130h, 130i, 130j, 130k and 130m (generically referred to also as users 130, hereinafter) communicably connected with the information management server 102 via a communication network 104.

Each of the users 130 is a user (registered user) registered beforehand for the information sharing system 100. It is assumed that identification information (user identification information) such as a user ID of the user 130 who is a registered user and access information and a mail address for communicating with the terminal device 110 of the user 130 are transmitted beforehand from the terminal device 110 to the information management server 102 by the user 130, and stored as user registration information in a storage device of the information management server 102, for example.

The terminal device 110 is a portable terminal such as a smartphone, in the present embodiment. However, the terminal device 110 is not limited to the portable terminal, and may be an arbitrary terminal device capable of receiving and visually and/or acoustically outputting information, such as a portable PC, a desktop PC and/or a notebook PC. The user 130 can join the information sharing system 100 and utilize it by executing an exclusive application program (joining application, hereinafter) for the information sharing system 100 for example, in his/her own terminal device 110. Hereinafter, it is assumed that the joining application is executed and the terminal device 110 configures a part of the information sharing system 100.

As described later, the terminal device 110 includes a display device 1612 (display) provided with a touch panel 1614, and the user 130 can input an instruction and/or information to the terminal device 110 via the touch panel 1614 by a touch operation to a display screen or the like.

The information management server 102 generates a thread which is a virtual storage space to preserve posts from the users 130, by receiving a thread creation request from the terminal device 110 of one of the users 130. Here, the user 130 who transmits the thread creation request to the information management server 102 by the terminal device 110 can include specifying of users to be invited to perform posting to the thread to be created.

The thread is disclosed only to a user group of joined users configured by the user 130 who is the creator and the other users 130 who have been invited to the thread and accepted to join, and only the posts from the respective users 130 within the user group are preserved in the thread.

In order to simplify explanation, in FIG. 1, it is assumed that the user 130a transmits the thread creation request to the information management server 102 through the terminal device 110a, and invites nine users that are the users 130b, 130c, 130d, 130e, 130f, 130g, 130h, 130i and 130j to the thread.

Figure 3:
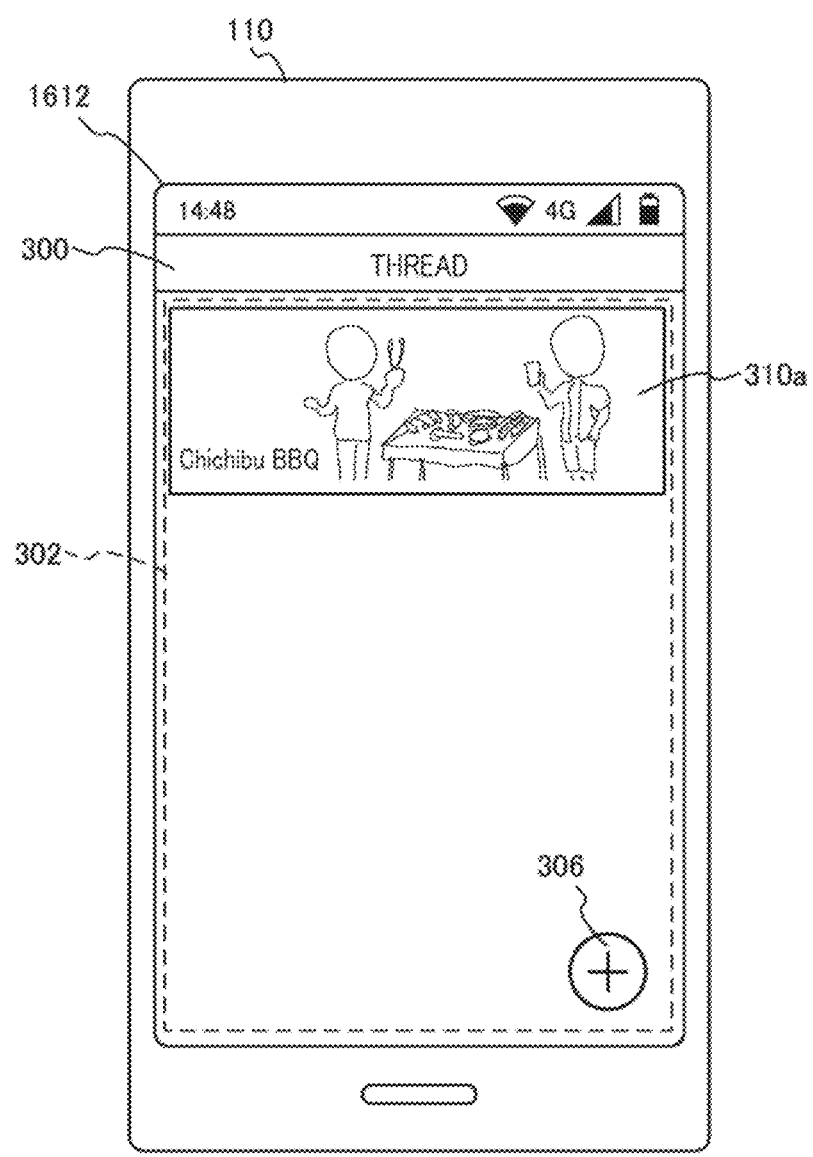
FIG. 3 is a diagram illustrating an example of a thread list screen, in a terminal device configuring the information sharing system illustrated in FIG. 1.

When a joining program is executed in the terminal device 110, a thread list screen as illustrated in FIG. 3 for example is displayed at a display device of the terminal device 110. In FIG. 3, a display screen of the display device 1612 of the terminal device 110 is configured by a title display section 300 and a main display section 302 (an illustrated broken line rectangular range). Characters of "THREAD" are displayed in the title display section 300, and in the main display section 302 below, the threads that the user 130 has joined (possibly including the thread created by the user 130 and the thread the user 130 has been invited to by the other user 130 and joined) are displayed in a thumbnail format. A thread box 310a illustrated in FIG. 3 is a display box where a thumbnail indicating the thread is displayed, and corresponds to one thread that the user 130 has joined. The terminal device 110 illustrated in FIG. 3 is the terminal device 110a owned by the user 130a for example, and a thread name "Chichibu BBQ" of the thread that the user 130a has joined, and the thumbnail of a representative image indicating an image of Chichibu BBQ are displayed in the thread box 310a.

Figure 4:
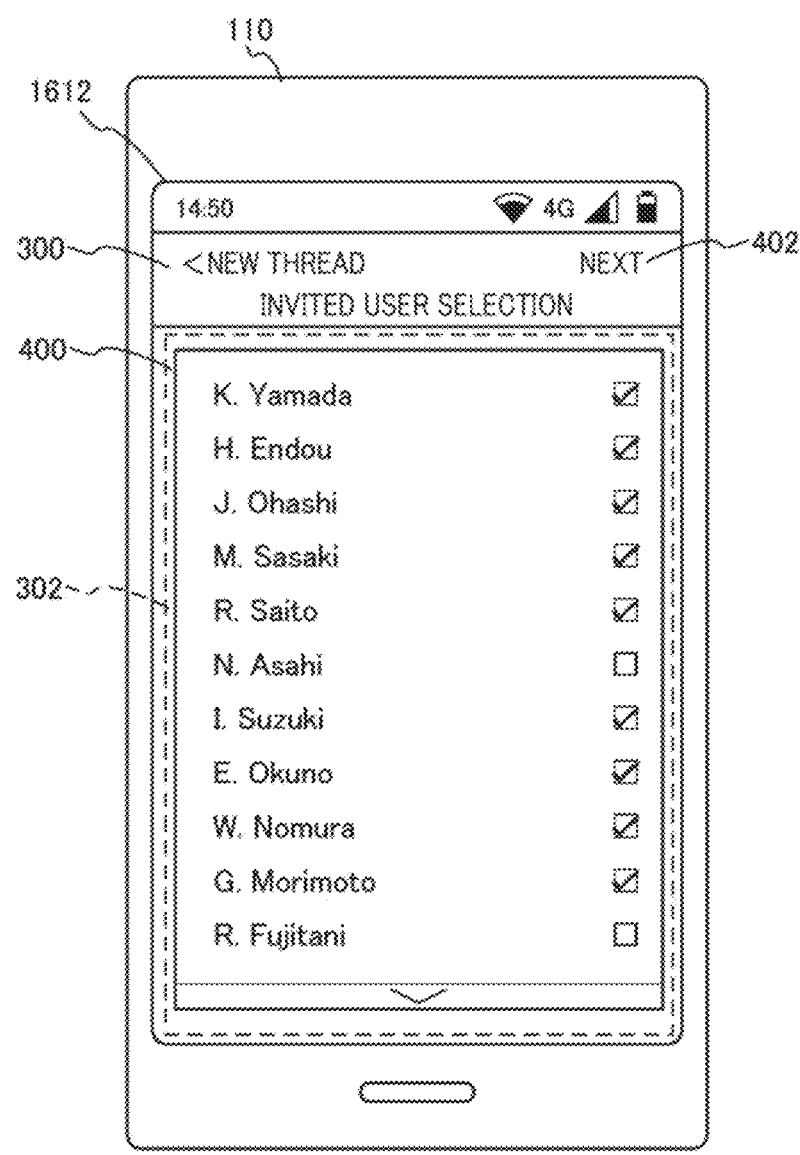
FIG. 4 is a diagram illustrating an example of an invited user selection screen when creating a thread, in the terminal device configuring the information sharing system illustrated in FIG. 1.

The user 130 can create a new thread by touching an addition button 306. For example, when the user 130 touches the addition button 306, an invited user selection screen for creating a new thread as illustrated in FIG. 4 is displayed at the terminal device 110. In FIG. 4, the characters of "<NEW THREAD" and "INVITED USER SELECTION" are displayed in the title display section 300, and it is indicated that the screen is the invited user selection screen for creating a new thread. By the screen, the user 130 is urged to select members (invited users) to be invited to perform posting to the thread to be created hereafter.

In the main display section 302, a user invitation box 400 for selecting the users (invited users) to be invited is displayed. In the user invitation box 400, a list of person names (or nicknames) to be candidates of the invited users is displayed, for example. By touching and checking off a check box provided on a right side of each person name, the user 130 can select a person of the checked person name as the invited user. Here, the person names to be the candidates of the invited users may be acquired from an address book stored in the terminal device 110. Note that a V-shaped symbol below the list indicates that the other person names continue below. The user 130 can move the list in a lower direction by swiping a display part of the user invitation box 400 and checks a desired person name, for example.

Figure 5:
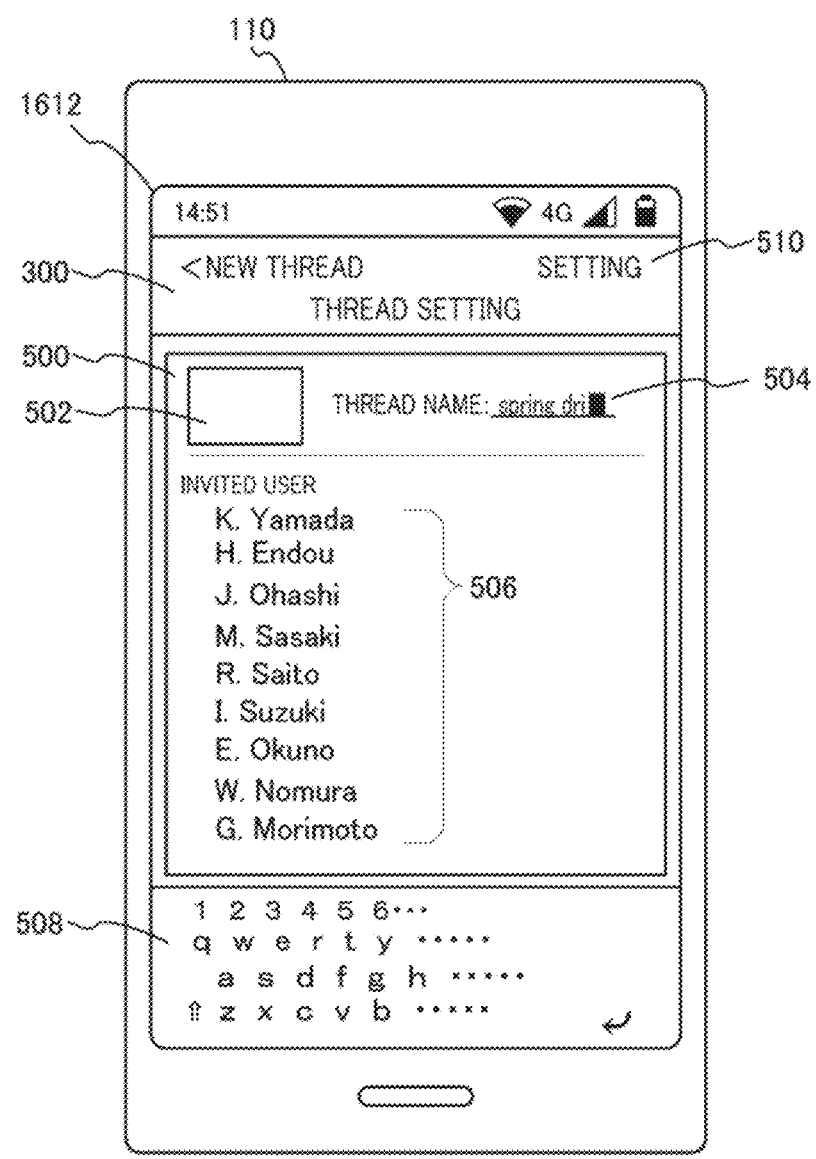
FIG. 5 is a diagram illustrating an example of a thread setting screen, in the terminal device configuring the information sharing system illustrated in FIG. 1.

After the invited users are selected, when the user 130 touches a text section 402 where "NEXT" is displayed in the title display section 300, the terminal device 110 displays a new thread setting screen illustrated in FIG. 5. In FIG. 5, the characters of "<NEW THREAD" and "THREAD SETTING" are displayed in the title display section 300, and it is indicated that the screen is the new thread setting screen. Below the title display section 300, a thread setting box 500 is displayed. At an upper part of the thread setting box 500, a representative image section 502 to display a representative image indicating an image of the thread under creation and a thread name input section 504 to input a name (thread name) of the thread are displayed.

In addition, below the representative image section 502 and the thread name input section 504 in the thread setting box 500, an invited user list 506 in which the invited users selected on the new thread creation screen in FIG. 4 are listed is indicated. Hereinafter, for the explanation, it is assumed that nine persons from "K. Yamada" to "G. Morimoto" listed in the invited user list 506 are the users 130b, 130c, 130d, 130e, 130f, 130g, 130h, 130i and 130j illustrated in FIG. 1 respectively, for example.

When the user 130 touches the representative image section 502, according to prior art, a list of images preserved in the terminal device 110 is popup-displayed on the display screen (not illustrated), and the user 130 can select a desired image from the displayed image list as a thread representative image. Thus, the selected image is displayed in the representative image section 502.

Further, the user 130 can input the thread name to the thread name input section 504 by a software keyboard 508 displayed at a screen lower part illustrated in FIG. 5. In FIG. 5, "spring drive" is inputted partway as the thread name.

When the user 130 inputs the thread name and touches a text section 510 where "SETTING" is displayed in the title display section 300, the terminal device 110 transmits the thread creation request including the thread name, the representative image and mail addresses of the selected invited users to the information management server 102. Here, the mail addresses of the invited users may be acquired from the address book stored in the terminal device 110, for example.

The information management server 102 which receives the thread creation request secures a thread storage area which is a storage area for preserving the posts to the thread inside a storage device of the information management server 102, and stores thread information, a joined user list, invited user information, and a synchronous joined user list in the thread storage area as thread attribute information. Thus, the thread according to the thread creation request is created. For example, one thread corresponds to one thread storage area, and therefore the thread storage areas for the same number as the number of created threads are secured in the storage device.

Here, the thread information includes the thread name and the representative image of the thread. In addition, the joined user list includes user identification information of the user 130 who is the creator of the thread. Further, the invited user information includes the user identification information of the respective users 130 who are the selected invited users. Here, the information management server 102 can specify the user identification information of the thread creator and the invited users by referring to the user registration information based on the access information of the terminal device 110 which is a transmission source and the mail addresses of the invited users attached to the thread creation request. The synchronous joined user list is used at the time of a synchronous reproduction operation to be described later, and is an empty list as default.

Then, the information management server 102 refers to the thread attribute information of all the thread storage areas, and transmits joined thread information including the thread names and the representative images of all the threads that the user 130 who has transmitted the thread creation request has joined, to the terminal device 110 which is the transmission source of the thread creation request. In addition, the information management server 102 transmits invitation mail for the created thread to the terminal devices 110 of the respective invited users, based on the respective mail addresses of the users 130 who are the invited users. In the above-described example, the information management server 102 transmits the invitation mail to the terminal devices 110b, 110c, 110d, 110e, 110f, 110g, 110h, 110i and 110j of the respective invited users, based on the respective mail addresses of the users 130b, 130c, 130d, 130e, 130f, 130g, 130h, 130i and 130j who are the invited users.

Figure 6:
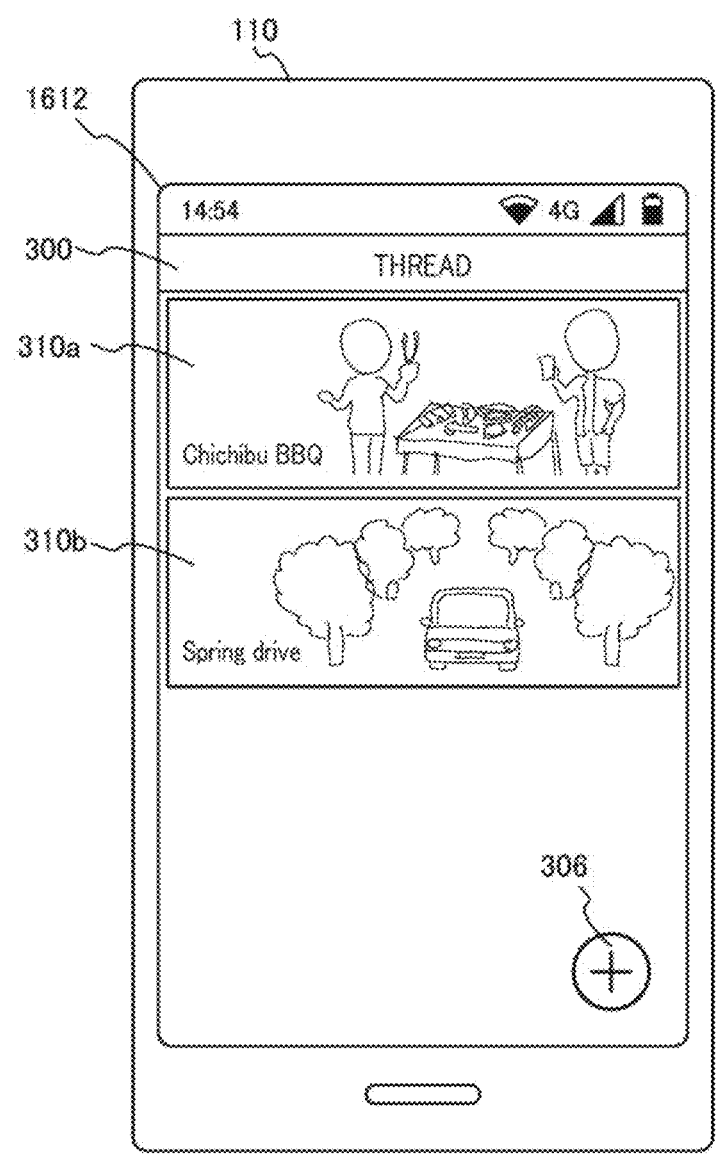
FIG. 6 is a diagram illustrating another example of the thread list screen, in the terminal device configuring the information sharing system illustrated in FIG. 1.

In addition, the terminal device 110 of the user 130 who has created the thread displays the thread list screen and displays all the threads that the user 130 has joined on the display device 1612, in response to reception of the joined thread information from the information management server 102. Thus, at the terminal device 110, the thread list screen as illustrated in FIG. 6 is displayed. On the thread list screen in FIG. 6, a new thread box 310b indicating the created thread of "spring drive" described above is added to the thread list screen illustrated in FIG. 3. (boxes that display threads like the thread boxes 310a and 310b are generically referred to also as thread boxes 310, hereinafter).

Figure 7:
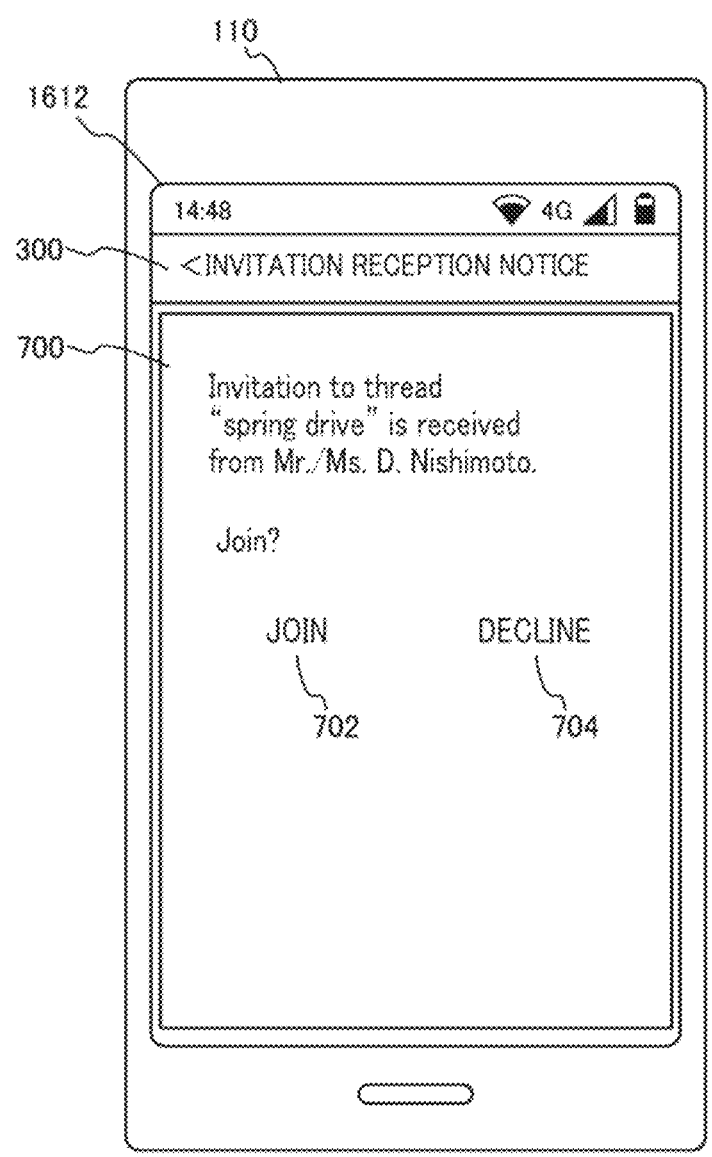
FIG. 7 is a diagram illustrating an example of an invitation reception notice screen when invitation mail to a thread is received, in the terminal device configuring the information sharing system illustrated in FIG. 1.

On the other hand, at the terminal devices 110 of the invited users who receive the invitation mail from the information management server 102, such as the terminal device 110b of the user 130b, an invitation reception notice screen as illustrated in FIG. 7 is displayed. In FIG. 7, text of "<INVITATION RECEPTION NOTICE" is displayed in the title display section 300, and in an invitation display box 700 below, text sections 702 and 704 of "JOIN" and "DECLINE" are displayed following a message of "Invitation to thread "spring drive" is received from Mr./Ms. D. Nishimoto. Join?". Here, "D. Nishimoto" is the person name that specifies the user 130 (the user 130a in the above-described example) who has created the "spring drive" thread.

The user 130 who receives the invitation mail, such as the user 130b, touches the text section 702 of "JOIN" in the case of accepting joining the "spring drive" thread and performing posting, on the screen in FIG. 7 which is displayed at his/her own terminal device 110b. On the other hand, in the case of not joining the "spring drive" thread (not performing posting), the user 130b touches the text section 704 of "DECLINE".

Depending on which of the text section 702 of "JOIN" and the text section 704 of "DECLINE" is touched, the terminal device 110 transmits a joining response and a declining response respectively to the information management server 102. When the joining response is received from the terminal device 110, the information management server 102 moves the user identification information of the user 130 in the invited user information preserved in the thread attribute information stored in the thread storage area corresponding to the "spring drive" thread to the joined user list preserved in the same thread attributed information. On the other hand, when the declining response is received from the terminal device 110, the information management server 102 deletes the user identification information of the user 130 in the invited user information.

When the joining response or the declining response is received from the terminal devices 110 of the users 130 who are all the invited users, the invited user information becomes empty, and the user identification information of all the users 130 who have joined the thread is included in the joined user list. Hereinafter, the users who have joined the thread are also referred to as the joined users of the thread. Specifically, the joined users are configured by the user 130 who has created the thread and the users 130 who have been invited to the thread and returned the joining response.

Here, in the example of the "spring drive" thread described above, for example, it is assumed that, of nine users 130b, 130c, 130d, 130e, 130f, 130g, 130h, 130i and 130j who are the invited users, eight users 130b, 130c, 130d, 130e, 130f, 130g, 130h and 130i have returned the joining response and the user 130j has returned the declining response. Thus, the joined users of the "spring drive" thread are nine persons that are the user 130a who has created the thread and the users 130b, 130c, 130d, 130e, 130f, 130g, 130h and 130i who have returned the joining response. The respective joined users can perform posting to the "spring drive" thread by their own terminal devices 110a, 110b, 110c, 110d, 110e, 110f, 110g, 110h and 110i.

Next, with the post to the "spring drive" thread as an example, the post to the thread by the terminal device 110 and display of the post in the terminal device 110 will be described.

In the case of performing posting to the "spring drive" thread, the user 130 who is the joined user of the "spring drive" thread first executes the joining application in the terminal device 110 and displays the thread list screen. For example, the terminal device 110 requests the joined thread information to the information management server 102 according to execution of the joining application, acquires it, and displays the thread list screen as illustrated in FIG. 6 based on the acquired joined thread information.

Figure 8:
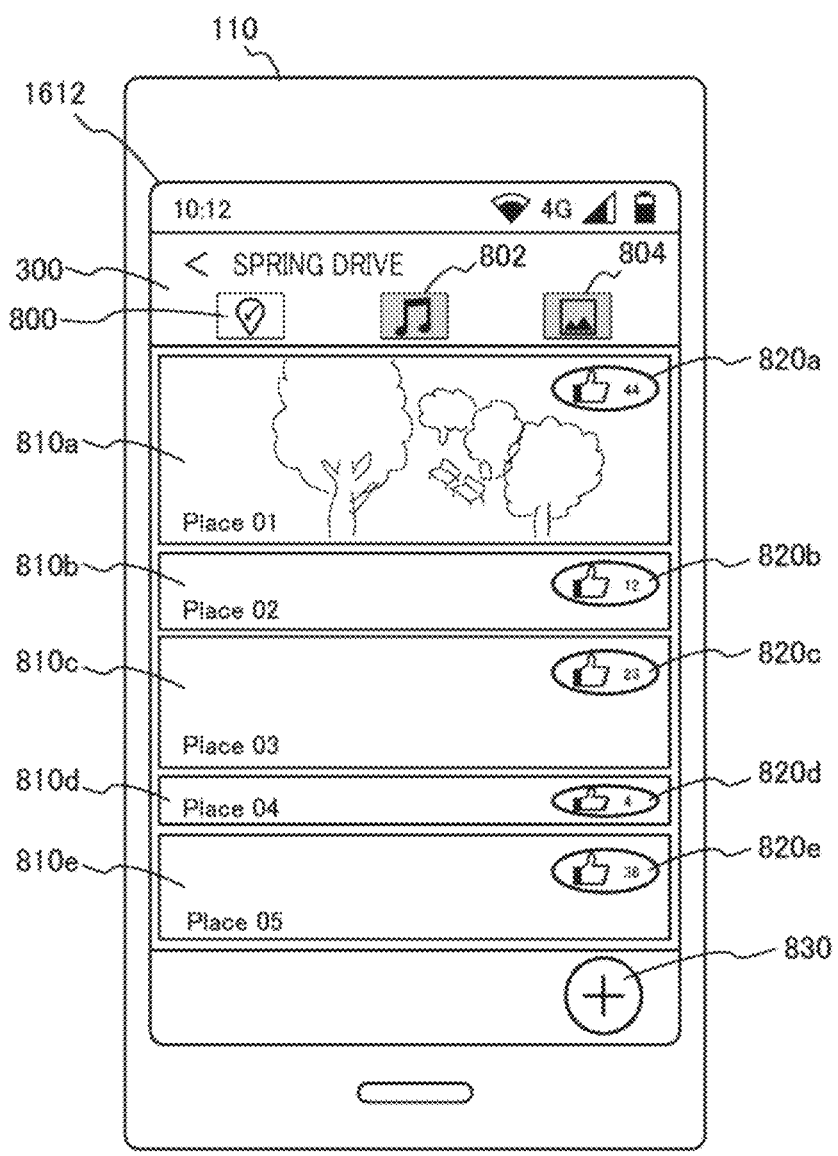
FIG. 8 is a diagram illustrating an example of a spot post screen, in the terminal device configuring the information sharing system illustrated in FIG. 1.

In FIG. 6, when the user 130 touches the thread box 310b of the "spring drive" thread, for example, a post screen as illustrated in FIG. 8 is displayed. In FIG. 8, in the title display section 300, in addition to the text "<SPRING DRIVE", category selection buttons 800, 802 and 804 are displayed.

An icon symbolizing a spot flag is displayed on the category selection button 800, and the category selection button 800 is used when selecting a spot post screen for a post regarding a POI (a place or a spot of interest, Position Of Interest) such as a tourist spot. In addition, icons indicating a musical note and a photograph are respectively displayed on the category selection buttons 802 and 804, and the category selection buttons 802 and 804 are used when selecting an AV post screen for posting music or the like (including music and moving images) and a photograph post screen for posting photographs, respectively.

When displaying the spot post screen, the AV post screen and the photograph post screen, the terminal device 110 acquires post list information listing all the posts preserved in the thread storage area of the corresponding thread from the information management server 102, and displays the spot post screen, the AV post screen and the photograph post screen based on the acquired post list information. The post list information includes information of content and a category (distinction of a spot, AV or a photograph) of each post.

In FIG. 8, for example, the spot post screen as an initial spot screen to be shifted to from the thread list screen in FIG. 6 is illustrated. On the screen in FIG. 8, by emphatically displaying the category selection button 800 on which the spot flag icon is displayed with high luminance compared to the category selection buttons 802 and 804 drawn with shadows, it is indicated that the screen is the spot post screen.

In FIG. 8, five posts regarding the POI already submitted to the "spring drive" thread are indicated at a lower part of the title display section 300 in the thumbnail format. Specifically, in spot post boxes 810a, 810b, 810c, 810d and 810e (generically referred to also as spot post boxes 810, hereinafter) indicating each of the five posted POIs, a thumbnail indicating each POI is displayed. A line drawing indicating the thumbnail is drawn only in the spot post box 810a in FIG. 8 in order to simplify the diagram and facilitate understanding, however, it should be understood that the thumbnail is also displayed respectively in the other spot post boxes 810.

The user 130 can post a desired POI to the "spring drive" thread by touching an addition button 830 at a screen lower part illustrated in FIG. 8. The post of the POI may include POI information configured by a name of the POI (for example, a spot name or a common name such as "Kumagaya sakuratsutsumi"), position information (latitude/longitude or the like) and a photograph image of the spot or the like, according to the prior art. For example, the user 130 can post the POI by inputting the above-described POI information to a popup box (not illustrated) displayed by touching the addition button 830, according to the prior art. Or, the user 130 can post information regarding the spot searched by a map application such as Google Map® to the "spring drive" thread as the POI information via a sharing function provided by an OS (operating system) or the like of the terminal device 110 for example.

By touching one of the displayed spot post boxes 810, the user 130 can display the POI information indicated by the post corresponding to the spot post box 810 on the screen of the terminal device 110 (not illustrated). The display of the POI information can be configured by the image of the map indicating the position of the POI and the photograph image of the spot, for example.

In the respective spot post boxes 810 displayed by the post of the POI, the name (indicated by illustrated "Place01" or the like) of the POI indicated by the post corresponding to the spot post box 810 and voting buttons 820a, 820b, 820c, 820d and 820e (generically referred to also as voting buttons 820, hereinafter) for voting for the post are indicated. In the present embodiment, the voting buttons 820 are so-called "like" buttons to be touched when giving affirmative evaluation to the corresponding post.

In the case of being interested in the POI (that is, the place indicated by Place01) indicated by the spot post box 810a as a destination or a place to stop by for the "spring drive", for example, the user 130 can give the affirmative evaluation to the posted POI by touching the voting button 820a. The number of times of touching per joined user is arbitrary, and each joined user performs touching for a larger number of times as a degree of the affirmative evaluation that he/she has for the post is greater.

An evaluation result as the entire joined users for the POI indicated by the spot post box 810a is displayed in the respective voting buttons 820, as a number indicating the total number of times over the entire terminal devices 110 for the numbers of times that the voting buttons 820 displayed respectively at the terminal devices 110a, 110b, 110c, 110d, 110e, 110f, 110g, 110h and 110i of the users 130a, 130b, 130c, 130d, 130e, 130f, 130g, 130h and 130i who are the joined users of the "spring drive" thread are pressed (touched), for example. For example, the number "44" displayed in the voting button 820a indicates that the total number of times that the voting button 820a is pressed as the affirmative evaluation is 44. Hereinafter, the total number of times that the voting button 820 is pressed at the terminal devices 110 of all the joined users is also referred to as a "vote number" for the post corresponding to the voting button 820 (it is also the same for voting buttons 920 and 1120 to be described later).

In particular, in the information sharing system 100 of the present embodiment, according to the vote number of the affirmative evaluation regarding the post to the "spring drive" thread, a display aspect of the thumbnail which is displayed at the terminal device 110 and indicates the post, a size of the thumbnail for example, is changed.

In FIG. 8, the size of the spot post box 810a is set the largest and displayed such that the thumbnail indicating the post for "place01" which has acquired the largest vote number of 44 is displayed in the largest size, in a descending order of the vote numbers displayed in the voting buttons 820a, 820b, 820c, 820d and 820e. In addition, the size of the spot post box 810d is set the smallest and displayed such that the thumbnail indicating the post for "Place 04" which has acquired the smallest four votes is displayed in the smallest size.

Thus, since a distribution state of the affirmative evaluation of the joined users among the posts can be intuitively recognized by the sizes of the thumbnails indicating the respective posts, each joined user can easily recognize a preference trend as the entire joined users. Using these displays of the thumbnail, for example, the user 130a who has created the "spring drive" thread can narrow down the posts regarding the POI to the several posts of the high-order vote numbers, and rationally and quickly decide the destination of the spring drive with the joined users or the like.

Figure 9:
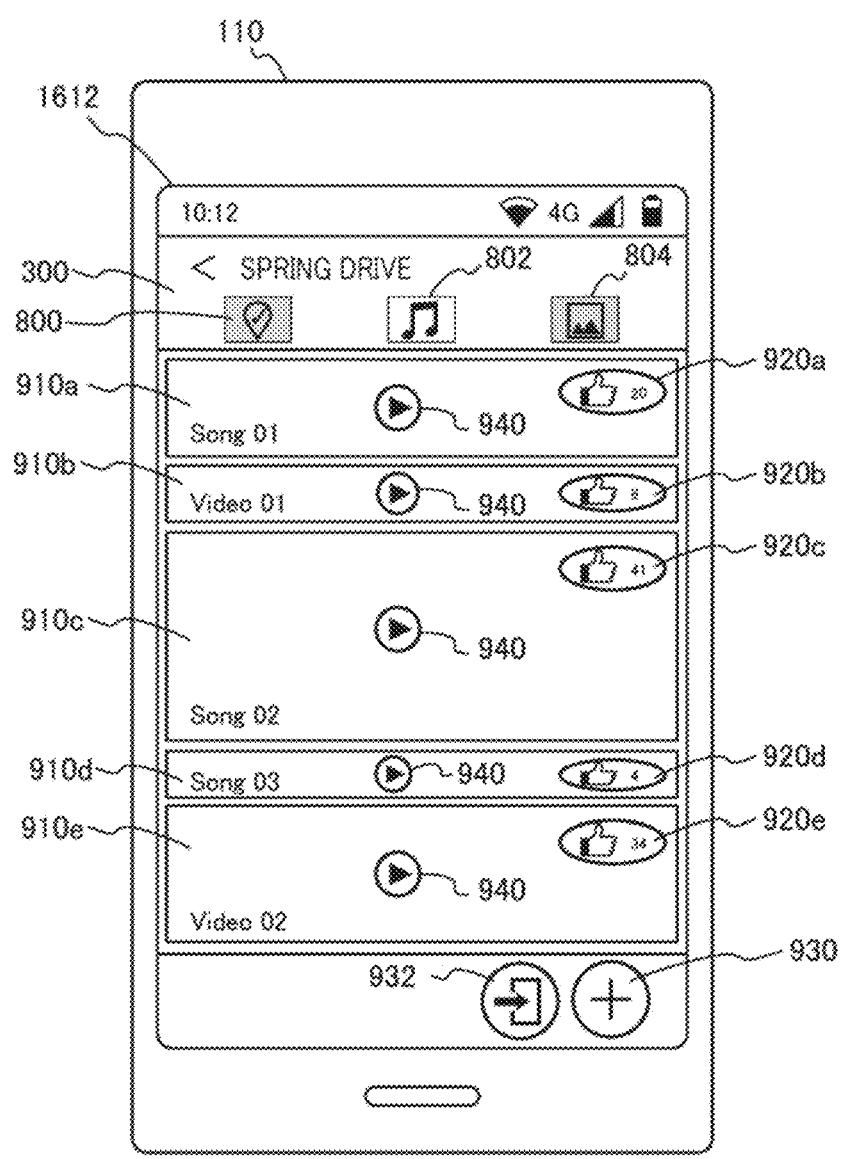
FIG. 9 is a diagram illustrating an example of an AV post screen, in the terminal device configuring the information sharing system illustrated in FIG. 1.

The user 130 can display the AV post screen as illustrated in FIG. 9 at the terminal device 110, for example, by touching the category selection button 802 indicated in the title display section 300 in the display illustrated in FIG. 8. In FIG. 9, by emphatically displaying the category selection button 802 on which a musical note icon is drawn with the high luminance compared to the category selection buttons 800 and 804 drawn with shadows, it is indicated that the screen is the AV post screen.

In FIG. 9, the thumbnails indicating already posted three pieces of music and two moving images are indicated at the lower part of the title display section 300. Specifically, in AV post boxes 910a, 910c and 910d indicating the posts for three musical pieces "Song01", "Song02" and "Song03" respectively, the thumbnails of illustrative images of the respective musical pieces are displayed. In addition, in AV post boxes 910b and 910e indicating the posts for two moving images "Video01" and "Video02" respectively, the thumbnails of the illustrative images of the respective moving images are displayed. Hereinafter, the AV post boxes 910a, 910b, 910c, 910d and 910e are generically referred to also as AV post boxes 910. A line drawing indicating the thumbnail is not drawn in the AV post boxes 910 in FIG. 9 in order to simplify the diagram and facilitate understanding, however, it should be understood that the thumbnail is displayed in each of the AV post boxes 910 as described above.

In each of the AV post boxes 910, a reproduction button 940 is also provided. Each reproduction button 940 is used when reproducing the music or the like of the post indicated by the corresponding AV post box 910.

Figure 10:
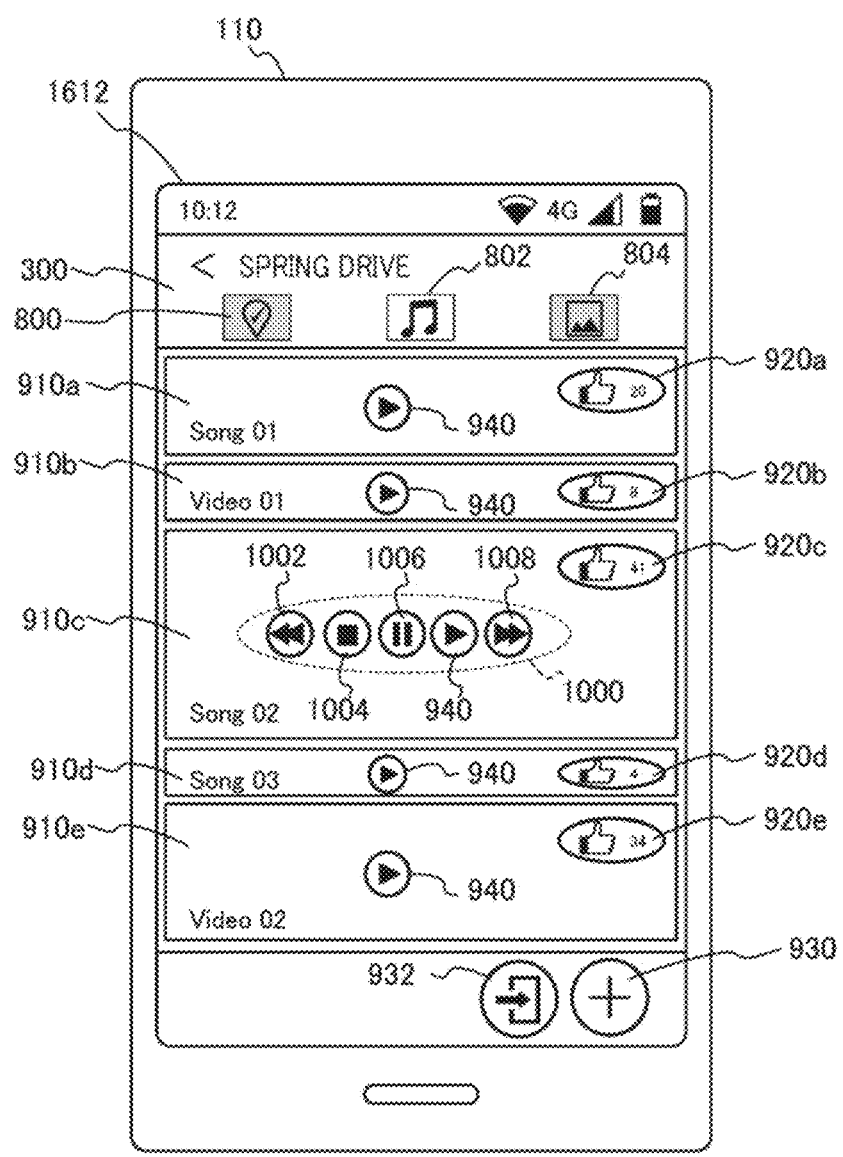
FIG. 10 is a diagram illustrating an example of a screen when reproducing AV content, in the terminal device configuring the information sharing system illustrated in FIG. 1.

For example, by touching the reproduction button 940 of the AV post box 910c, the user 130 can make the terminal device 110 output the music "Song02" of the post indicated by the AV post box 910c. After the user 130 touches the reproduction button 940 of the AV post box 910c and reproduction of Song02 is started, as illustrated in FIG. 10, an operation button set 1000 for performing various reproduction operations is displayed in the AV post box 910c. The operation button set 1000 is configured by, in addition to the reproduction button 940, a return button 1002 for turning back a present reproduction part by a predetermined period of time, a stop button 1004, a temporary stop button 1006, and a feed button 1008 for feeding the present reproduction part forward by the predetermined period of time, for example.

The user 130 can post the music or the like to the "spring drive" thread by touching an addition button 930 at the screen lower part illustrated in FIG. 9.

The post of the music or the like may include, for example, access information (for example, an address of a server or an URL of a site) to a storage location where data for reproduction of the music or the like is stored, and the image of the thumbnail to be displayed in the AV post box 910, according to the prior art. For example, the user 130 can post the information of the musical piece searched by a music search application such as Spotify® to the "spring drive" thread via the sharing function provided by the OS (operating system) or the like of the terminal device 110.

In the respective AV post boxes 910 created and displayed when the music or the like is posted, the name (indicated by illustrated "Song01" or the like and "Video01" or the like) of the music or the like corresponding to the AV post box 910 and voting buttons 920a, 920b, 920c, 920d and 920e (generically referred to also as the voting buttons 920, hereinafter) for voting for the post of the music or the like are displayed. In the present embodiment, the voting buttons 920 are the so-called "like" buttons to be touched when giving the affirmative evaluation to the corresponding post, similarly to the voting buttons 820 described above.

For example, the user 130 who is the joined user of the "spring drive" thread can give the affirmative evaluation to the post of the music or the like indicated by the corresponding AV post box 910 by touching the voting button 920 displayed at his/her terminal device 110. The number of times of touching per joined user is arbitrary, and each joined user performs touching for the larger number of times as the degree of the affirmative evaluation that he/she has for the post is greater.

The evaluation result as the entire joined users for the music or the like indicated by each AV post box 910 is displayed in the voting button 920, as the total number of times (that is, the vote number) that the voting button 920 of the AV post box 910 is pressed in the entire terminal devices 110 of the joined users.

Similarly to the post of the POI described above, also for the post of the music or the like, according to the vote number of the affirmative evaluation from the joined users, the display aspect of the thumbnail which is displayed at the terminal device 110 to indicate the post of the music or the like, the size of the thumbnail for example, is changed. In FIG. 9, the size of the AV post box 910c is set the largest and displayed such that the thumbnail of the post of "Video02" which has acquired the largest vote number is displayed in the largest size, in the descending order of the vote numbers indicated in the voting buttons 920.

Thus, the user 130 can intuitively recognize the distribution state of the affirmative evaluation of the joined users among the posts by the sizes of the thumbnails indicating the respective posts, and can easily recognize the preference trend as the entire joined users. For example, when going for a drive to any place indicated by the posted POI illustrated in FIG. 8, the user 130 can enjoy the spring drive by performing reproduction in order from the music or the like of the post with the large vote number.

Figure 11:
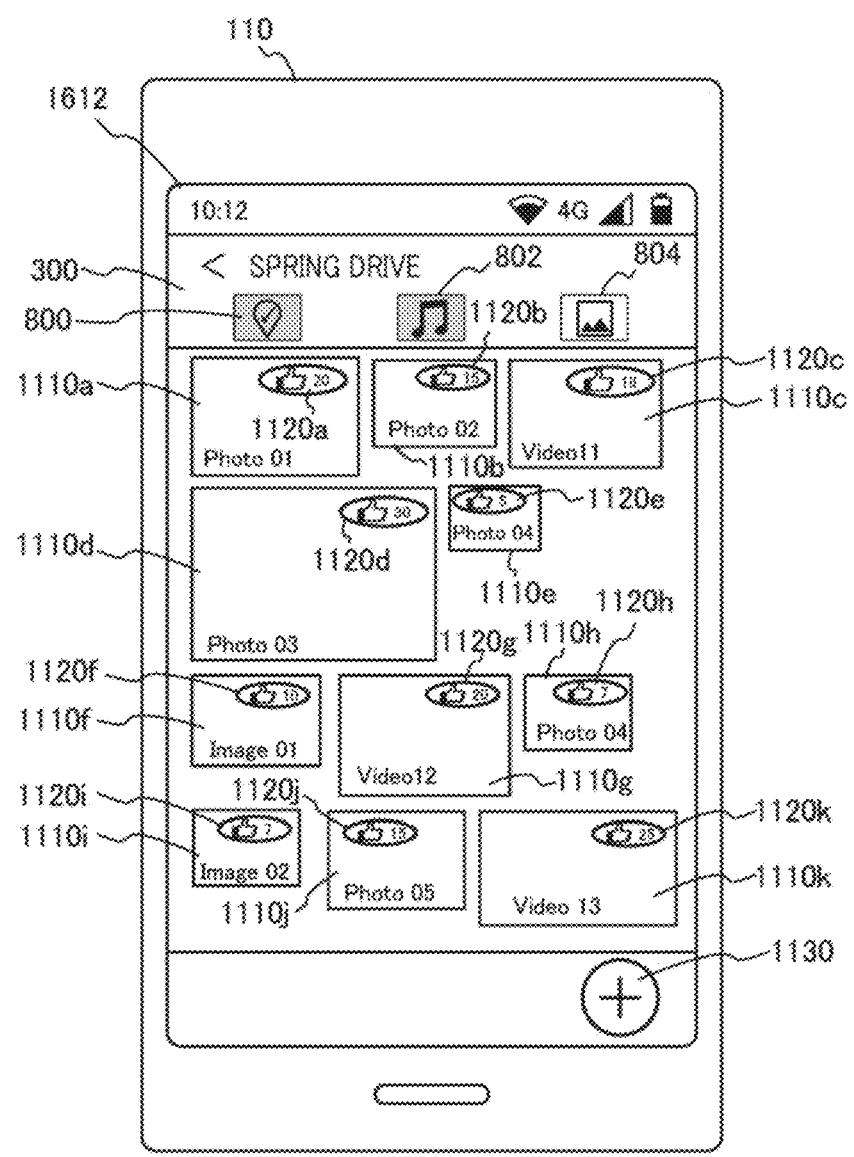
FIG. 11 is a diagram illustrating an example of a photograph post screen, in the terminal device configuring the information sharing system illustrated in FIG. 1.

Further, the user 130 can display the photograph post screen as illustrated in FIG. 11 at the terminal device 110, for example, by touching the category selection button 804 indicated in the title display section 300 in the display illustrated in FIG. 8-FIG. 10. In FIG. 11, by emphatically displaying the category selection button 804 on which a photograph icon is displayed with the high luminance compared to the category selection buttons 800 and 802 drawn with shadows, it is indicated that the screen is the photograph post screen.

The posts regarding photographs displayed on the photograph post screen can include not only the photographs but also arbitrary still images and moving images. For example, photographed video images (moving images) and scan images of a brochure acquired while traveling may be posted. Hereinafter, the photographs, the moving images and/or the other images posted on the photograph post screen are generically referred to also as the photographs or the like.

In FIG. 11, the 11 thumbnails indicating the photographs or the like already posted to the "spring drive" thread are indicated at the lower part of the title display section 300. Specifically, in photograph post boxes 1110a, 1110b, 1110c, 1110d, 1110e, 1110f, 1110g, 1110h, 1110i, 1110j and 1110k (generically referred to also as photograph post boxes 1110, hereinafter) indicating each of the 11 posts for the photograph or the like, the thumbnail of the image of each photograph or the like is displayed. A line drawing indicating the thumbnail is not drawn in the photograph post boxes 1110 in FIG. 11 in order to simplify the diagram and facilitate understanding, however, it should be understood that the thumbnail is displayed in each of the photograph post boxes 1110 as described above.

"Photo01", "Video11" and "Image01" or the like indicated in the photograph post boxes 1110 are the names of the photographs or the like. The names of the photographs or the like may be, for example, file names of data files of image data or video data (also referred to as image data or the like, hereinafter) of the photographs or the like.

The photographs or the like may be posted at arbitrary timing after the "spring drive" thread is created. For example, each joined user of the "spring drive" thread may post the photographs or video photographed previously before going on a trip as the spring drive, or may post the photographs or the video photographed while traveling while or after traveling.

By touching the photograph post box 1110 indicating the already posted photograph or the like, the user 130 can display the posted photograph or the like indicated by the photograph post box 1110 at the terminal device 110 (not illustrated). In addition, by touching an addition button 1130 at the screen lower part illustrated in FIG. 11, the user 130 can post the photograph or the like to the "spring drive" thread.

The post of the photograph or the like may include, for example, the access information to the storage location where the image data or the like of the photograph or the like is stored, according to the prior art. For example, the user 130 can post the photograph or the like photographed using a camera function or a video recorder function provided in the terminal device 110 to the "spring drive" thread via the sharing function provided by the OS (operating system) or the like of the terminal device 110.

In the photograph post boxes 1110 created and displayed when the photograph or the like is posted, voting buttons 1120a, 1120b, 1120c, 1120d, 1120e, 1120f, 1120g, 1120h, 1120i, 1120j and 1120k (generically referred to also as the voting buttons 1120, hereinafter) corresponding to the photograph post box 1110 for voting for the post of the photograph or the like are displayed. In the present embodiment, the voting buttons 1120 are the so-called "like" buttons to be touched when giving the affirmative evaluation to the corresponding post, similarly to the voting buttons 820 and 920 described above.

For example, each user 130 who is the joined user of the "spring drive" thread can give the affirmative evaluation to the post of the photograph or the like indicated by the corresponding photograph post box 1110 by touching the voting button 1120 displayed at his/her terminal device 110. The number of times of touching per joined user is arbitrary, and each joined user performs touching for the larger number of times as the degree of the affirmative evaluation that he/she has for the post is greater.

The evaluation result as the entire joined users for each photograph or the like indicated by the photograph post box 1110 is displayed in the voting button 1120, as the total number of times (that is, the vote number) that the voting button 1120 of the photograph post box 1110 is pressed in the entire terminal devices 110 of the joined users.

Similarly to the post of the POI and the post of the music or the like described above, also for the post of the photograph or the like, according to the vote number of the affirmative evaluation from the joined users, the display aspect of the thumbnail which is displayed at the terminal device 110 to indicate the post of the photograph or the like, the size of the thumbnail for example, is changed. In FIG. 11, the size of the photograph post box 1110d is set the largest and displayed such that the thumbnail of the post of "Photo03" which has acquired the largest vote number is displayed in the largest size, in the descending order of the vote numbers indicated in the voting buttons 1120.

Thus, the user 130 can intuitively recognize the distribution state of the affirmative evaluation of the joined users among the posts of the photograph or the like by the sizes of the thumbnails indicating the respective posts, and can easily recognize the preference trend as the entire joined users. For example, after coming back from a drive to any place indicated by the posted POI illustrated in FIG. 8, the user 130 can remember the spring drive by performing the reproduction in order from the photograph or the like of the post with the high affirmative evaluation.

In the information sharing system 100, further, the content included in the post of the thread, the music or the like for example, can be synchronously reproduced among the joined users of the thread. For example, the user 130 can join the synchronous reproduction by touching a synchronous reproduction button 932 displayed at the screen lower part, when the AV post screen like FIG. 9 or FIG. 10 is displayed at his/her terminal device 110. Hereinafter, the user who has joined the synchronous reproduction is referred to as a synchronous joined user.

After joining the synchronous reproduction, the user 130 can perform the synchronous reproduction for the music or the like posted to the thread among the synchronous joined users (that is, together with the other users 130 who are the joined users and have joined the synchronous reproduction by a similar operation).

The music or the like can be synchronously reproduced by the information management server 102 simultaneously transmitting the information of a content reproduction operation (simply referred to also as a reproduction operation, hereinafter) acquired in the terminal device 110 of an arbitrary user 130 who is the synchronous joined user to the terminal devices 110 of all the users 130 who are the synchronous joined users, for example. Here, the reproduction operation is, for example, an operation performed by the user 130 using the reproduction button 940 or the operation button set 1000 (also referred to as the reproduction button 940 or the like, hereinafter) illustrated in FIG. 9 or FIG. 10, and may include an operation of instructing start and stop of the reproduction of the content (that is, the music or the like) of the post indicated by any AV post box 910, at least.

Specifically, for example, when the user 130 touches the synchronous reproduction button 932 on the AV post screen like FIG. 9, the terminal device 110 transmits a joining request regarding the synchronous reproduction for the content of the post regarding the "spring drive" thread to the information management server 102. The joining request includes the user identification information of the user 130 who is the transmission source of the joining request and the thread name of the thread that the user 130 wants to join, "spring drive" for example.

When the joining request is received, the information management server 102 adds the user identification information of the user 130 who is the transmission source of the joining request to the synchronous joined user list preserved in the thread storage area of the thread. When transmitting a synchronous reproduction instruction (to be described later) to the terminal device 110 of the synchronous joined user, the information management server 102 refers to the preserved synchronous joined user list, and specifies the user 130 to transmit the synchronous reproduction instruction. The access information to the terminal device 110 of the specified user 130 is acquired from the user registration information stored in the information management server 102.

By touching the synchronous reproduction button 932, the terminal device 110 shifts to a synchronous reproduction mode operation. In a synchronous reproduction mode, the terminal device 110 sends reproduction operation information regarding the content reproduction operation acquired from the reproduction button 940 or the like to the information management server 102. When the reproduction operation information is received, the information management server 102 transmits the synchronous reproduction instruction to the terminal devices 110 of all the synchronous joined users based on the reproduction operation information. When the synchronous reproduction instruction is received from the information management server 102, the terminal device 110 executes the operation (the start and stop of the reproduction, for example) corresponding to the reproduction operation indicated by the synchronous reproduction instruction.

The reproduction operation information includes the user identification information of the user 130, post identification information of the post which is a synchronous reproduction object, information of a present reproduction part of the content of the post, and the content (reproduction start, stop and temporary stop or the like, for example) of the reproduction operation. In addition, the synchronous reproduction instruction includes the post identification information of the post which is the synchronous reproduction object, the information of the present reproduction part of the content of the post, and the content (the reproduction start, stop and temporary stop or the like, for example) of the reproduction operation to be executed in the terminal devices 110. The information of the present reproduction part is the time needed to reach the present reproduction part when the content is reproduced from the beginning at a normal speed, for example.

Figure 12:
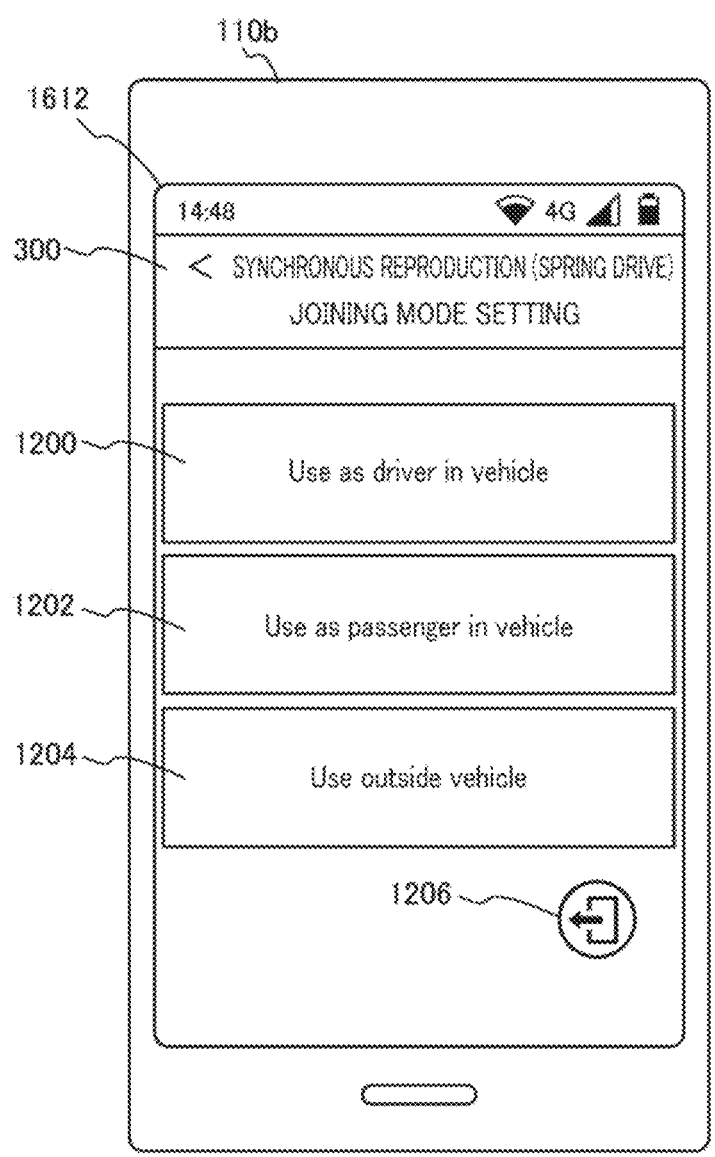
FIG. 12 is a diagram illustrating an example of a joining mode setting screen for a synchronous reproduction operation, in the terminal device configuring the information sharing system illustrated in FIG. 1.

By touching the synchronous reproduction button 932, the terminal device 110 displays a joining mode setting screen as illustrated in FIG. 12. In FIG. 12, under the title display section 300, three mode setting buttons 1200, 1202 and 1204 where "Use as driver in vehicle", "Use as passenger in vehicle" and "Use outside vehicle" are displayed respectively and a joining end button 1206 for ending the synchronous reproduction mode are provided.

The mode setting button 1200 is for setting when the user 130 utilizes a vehicle as a driver. Here, the vehicle is the vehicle loaded with a speaker or a display device capable of outputting the reproduced music or the like, and is a passenger vehicle for example. When the user 130 touches the mode setting button 1200, the terminal device 110 is operated in a driver mode. In the driver mode, the terminal device 110 establishes communication via short-range wireless communication of Bluetooth® or the like with an on-vehicle device of the vehicle so as to output the synchronously reproduced music or the like from the speaker or the display device of the vehicle through an AV controller which is the on-vehicle device, for example. In this case, since the communication between the terminal device 110 and the on-vehicle device of the vehicle is established, for example, the content reproduction operation can be performed by a steering switch (a switch provided on a steering wheel) of the vehicle instead of the reproduction button 940 or the like.

The mode setting button 1202 is for setting used when the user 130 utilizes the vehicle not as a driver but as a passenger. When the user 130 touches the mode setting button 1202, the terminal device 110 is operated in a passenger mode. In the passenger mode, the terminal device 110 sets an output operation from the speaker provided in the terminal device 110 to a mute state (output inhibition state).

Thus, in the case where the plurality of terminal devices 110 which perform the synchronous reproduction are present in the same vehicle for example, the content (the music or the like) synchronously reproduced from the plurality of terminal devices 110 can be prevented from being redundantly outputted. The user 130 who selects the passenger mode can share content reproduction output outputted through an on-vehicle speaker from the terminal device 110 of the other synchronous joined user operated in the driver mode with the other persons in the vehicle, for example, while participating in the synchronous reproduction operation by operating the reproduction button 940 or the like of his/her terminal device 110.

The mode setting button 1204 is for setting used when the user 130 does not utilize the vehicle. When the user 130 touches the mode setting button 1204, the terminal device 110 is operated in a vehicle outside mode. In the vehicle outside mode, the terminal device 110 outputs the synchronously reproduced music or the like from the speaker provided in the terminal device 110.

On the joining mode setting screen illustrated in FIG. 12, the user 130 can end joining the synchronous reproduction by touching the joining end button 1206 when wanting to stop joining the synchronous reproduction. When the joining end button 1206 is touched, the terminal device 110 transmits a joining end request to the information management server 102. The joining end request includes the user identification information of the user 130 who is a transmitter of the joining end request, and the thread identification information indicating the thread which is the object of the synchronous reproduction.

The information management server receives the joining end request, and deletes the user identification information of the user 130 who is the transmitter of the joining end request from the synchronous joined user list preserved in the thread storage area of the thread indicated by the joining end request.

Figure 13:
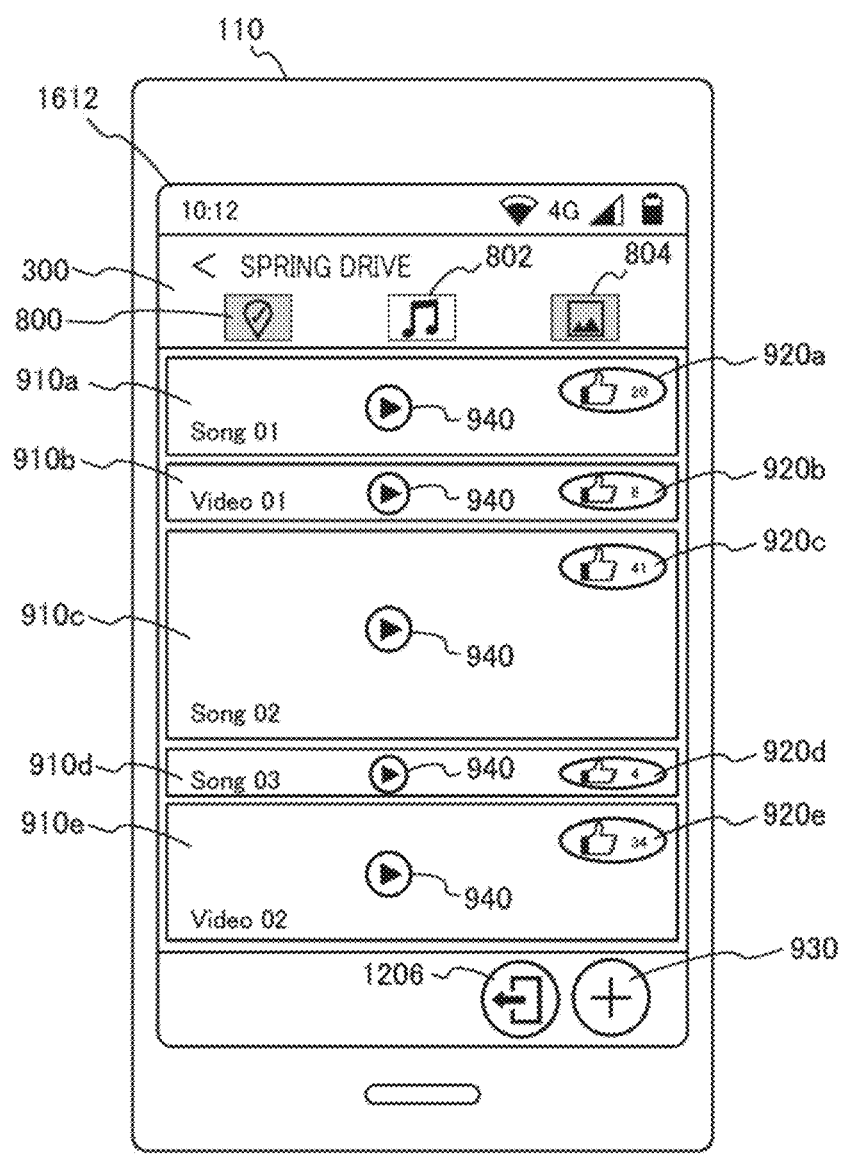
FIG. 13 is a diagram illustrating an example of an AV post screen at the time of the synchronous reproduction operation, of the terminal device configuring the information sharing system illustrated in FIG. 1.

When the user 130 touches one of the mode setting buttons 1200, 1202 and 1204, at the terminal device 110, a synchronous reproduction screen as illustrated in FIG. 13 is displayed, for example. The screen illustrated in FIG. 13 is similar to the AV post screen illustrated in FIG. 9, but it is indicated that it is the synchronous reproduction screen by displaying a background color of the AV post box 910 or the like in a color different from the background color on the AV post screen illustrated in FIG. 9. In addition, the synchronous reproduction screen illustrated in FIG. 13 is different from the AV post screen illustrated in FIG. 9 at a point that the joining end button 1206 similar to FIG. 12 is provided instead of the synchronous reproduction button 932.

On the synchronous reproduction screen in FIG. 13, by touching one of the reproduction buttons 940, the user 130 can reproduce the music or the like of the post indicated by the corresponding AV post box 910. For example, when the user 130 touches the reproduction button 940 of the AV post box 910c, the synchronous reproduction of the music of Song02 is started, and the operation button set 1000 similar to FIG. 10 is displayed in the AV post box 910c as illustrated in FIG. 14.

By operating each button configuring the operation button set 1000, the user 130 can operate the reproduction operation of Song02 for which the synchronous reproduction is started. For example, when the user 130 touches the temporary stop button 1006, the reproduction of Song02 being synchronously reproduced in the terminal devices 110 of all the synchronous joined users is temporarily stopped. In addition, for example, when the user 130 touches the feed button 1008, the present reproduction part of Song02 being synchronously reproduced in the terminal devices 110 of all the synchronous joined users is moved forward by the same predetermined time.

Figure 14:
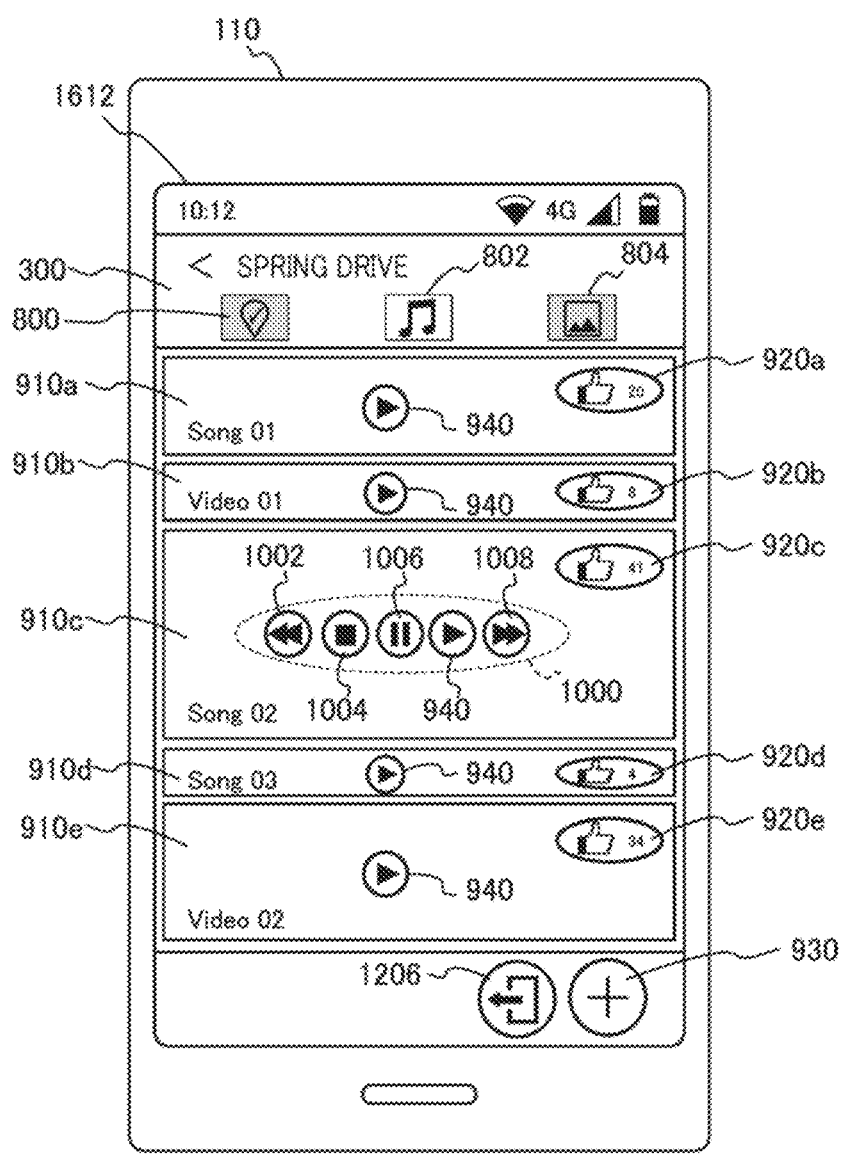
FIG. 14 is a diagram illustrating an example of screen display when content reproduction of music or the like is started, on the AV post screen at the time of the synchronous reproduction operation illustrated in FIG. 13.

Note that, even when another user 130 newly becomes the synchronous joined user in the case where one user 130 has already become the synchronous joined user and is synchronously reproducing some content, the image illustrated in FIG. 14 can be displayed by a direct shift from the joining mode setting screen illustrated in FIG. 12 at the terminal device 110 of that another user 130.

Figure 2:
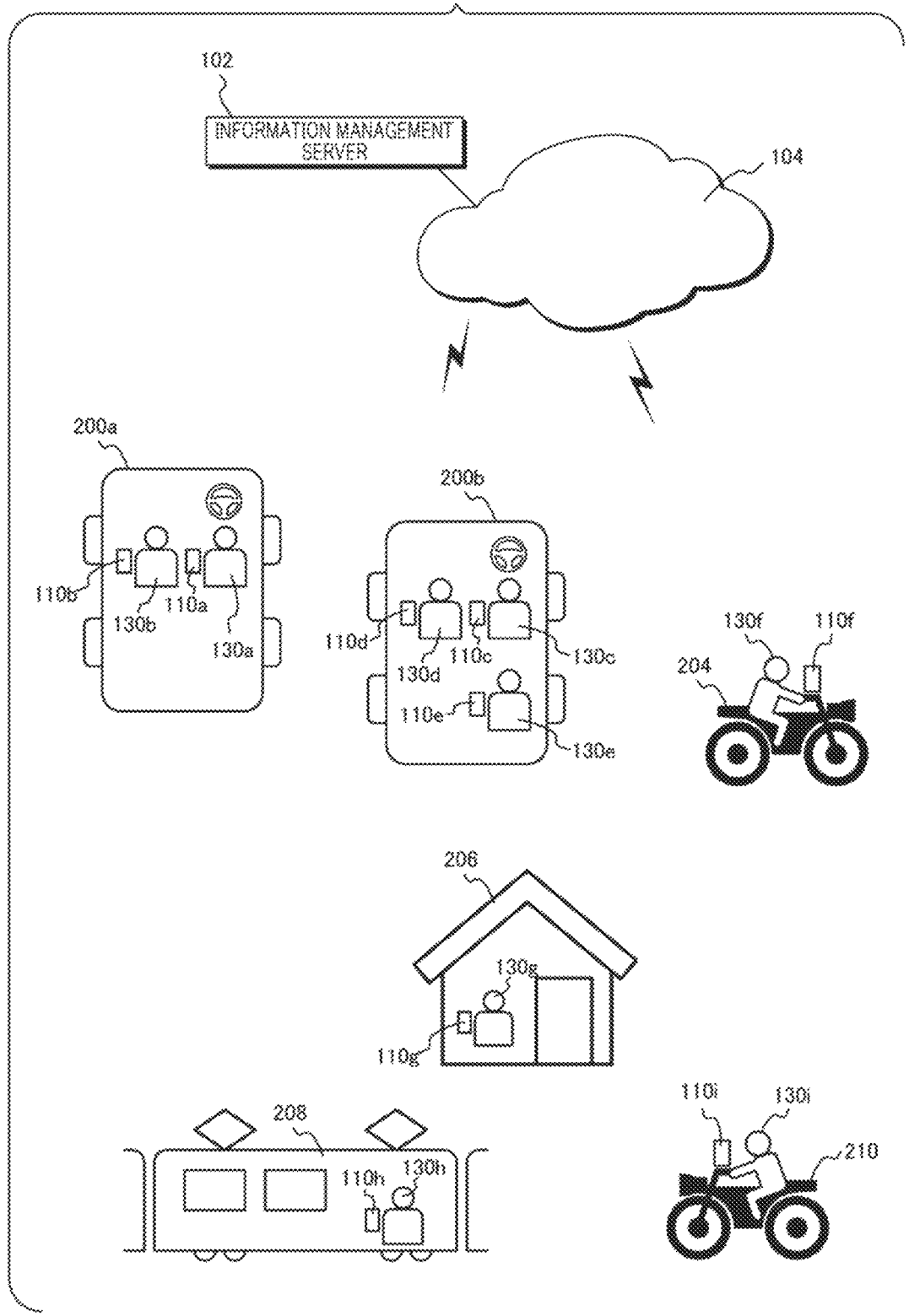
FIG. 2 is a diagram illustrating an example of a scene where a synchronous reproduction function of the information sharing system of the present invention is utilized.

FIG. 2 is a diagram illustrating an example of a scene where the music or the like posted to the thread is synchronously reproduced. In the scene illustrated in FIG. 2, some joined users of the "spring drive" thread determine some places as the place to stop by and the destination from the POIs of the respective posts displayed by the spot post boxes 810 in FIG. 8, and go for a drive. For example, the users 130a and 130b go for a drive in a vehicle 200a, the users 130c, 130d and 130e go for a drive in a vehicle 200b, and the user 130f goes for a drive on a bike 204. The users 130g, 130h and 130i who are the other joined users do not join the drive, and are doing housework in a house 206, moving on a train 208 and moving on a bike 210 respectively.

For example, the user 130c first touches the synchronous reproduction button 932 on the AV post screen illustrated in FIG. 9 displayed at his/her terminal device 110c, and becomes the first synchronous joined user. The user 130c is the driver of the vehicle 200b, and selects the driver mode by touching the mode setting button 1200 where "Use as driver in vehicle" is displayed on the joining mode setting screen illustrated in FIG. 12. Thus, the terminal device 110c of the user 130c is connected with the AV controller of the vehicle 200b by Bluetooth for example, and an output destination of the music or the like synchronously reproduced in the terminal device 110c becomes AV output equipment such as the speaker and/or the display device loaded on the vehicle 200b.

After touching the mode setting button 1200, the synchronous reproduction screen as illustrated in FIG. 13 and FIG. 14 is displayed at the terminal device 110c, and the user 130c starts the reproduction of the favorite music or the like by the reproduction button 940 or the like on the synchronous reproduction screen and watches and listens to the reproduced music or the like from the speaker and/or the display of the vehicle 200b.

After the user 130c becomes the synchronous joined user, for example, the user 130e sitting in a back seat of the vehicle 200b becomes the second synchronous joined user by touching the synchronous reproduction button 932 on the AV post screen illustrated in FIG. 9 at his/her terminal device 110e. The user 130e is the passenger of the vehicle 200b, and selects the passenger mode by touching the mode setting button 1202 where "Use as passenger in vehicle" is displayed on the joining mode setting screen illustrated in FIG. 12.

Thus, the terminal device 110e of the user 130e sets the speaker provided in the terminal device 110e to the mute state. The user 130e can watch and listen to the music or the like that the terminal device 110c of the user 130c is already outputting from the on-vehicle speaker and/or display device of the vehicle 200b together with the user 130c inside a vehicle compartment of the vehicle 200b. In this case, when the music or the like is the moving image, the user 130e can also watch the video image of the moving image at his/her terminal device 110e while listening to the sound of the moving image from the speaker of the vehicle 200b.

In addition, at the terminal device 110e of the user 130e, the synchronous reproduction screen as illustrated in FIG. 14 is displayed after the mode setting button 1202 is touched. The user 130e can temporarily stop the music or the like being reproduced at present or the like or newly start the synchronous reproduction of the music or the like of the other post by operating the reproduction button 940 or the like displayed at his/her terminal device 110e.

The user 130a who is the driver of the vehicle 200a and the user 130f who is the driver of the bike 204 can also become the synchronous joined users in the driver mode by their terminal devices 110a and 110f respectively, similarly to the user 130c described above. In addition, the user 130b who is the passenger of the vehicle 200a and the user 130d who is the remaining passenger of the vehicle 200b can become the synchronous joined users in the passenger mode by their terminal devices 110b and 110d respectively, similarly to the user 130e described above. Hereinafter, the vehicles 200a and 200b are generically referred to also as vehicles 200.

Here, the users 130a and 130f who newly become the synchronous joined users in the driver mode can watch and listen to the music or the like already being reproduced at the terminal device 110c of the user 130c from the part being reproduced at present by the terminal devices 110a and 110f.

Further, the user 130g who is another joined user becomes the synchronous joined user by touching the synchronous reproduction button 932 at his/her terminal device 110g in the house 206, and selects the vehicle outside mode by touching the mode setting button 1204 where "Use outside vehicle" is displayed on the joining mode setting screen illustrated in FIG. 12. The terminal device 110g synchronously reproduces the same music or the like together with the terminal devices 110 of the other synchronous joined users, and the music or the like is watched and listened to from the speaker and/or the display device provided in the terminal device 110g.

On the other hand, the joined users who do not want the synchronous reproduction operation, the users 130h and 130i for example, can watch and listen to the music or the like at their terminal devices 110h and 110i independent of the terminal devices 110 of the other users 130 by pressing the reproduction button 940 of the AV post box 910 of the post of the favorite music or the like without touching the synchronous reproduction button 932 on his/her terminal devices 110h and 110i, respectively.

In the information sharing system 100 having the above-described configuration, among the terminal devices 110 of the users 130 who have become the synchronous joined users by touching the synchronous reproduction button 932 among the joined users of the thread, the content of the music or the like for which an arbitrary synchronous joined user has performed the reproduction operation using his/her terminal device 110 is synchronously reproduced. Thus, in the information sharing system 100, since the content of the posted music or the like can be synchronously watched and listened to among the users who have traveled together for example, sharing of an experience among a plurality of users related to the content reproduction can be promoted and oneness of the shared experience can be improved.

Hereinafter, the configurations of the information management server 102 and the terminal device 110 configuring the information sharing system 100 will be described.

Figure 15:
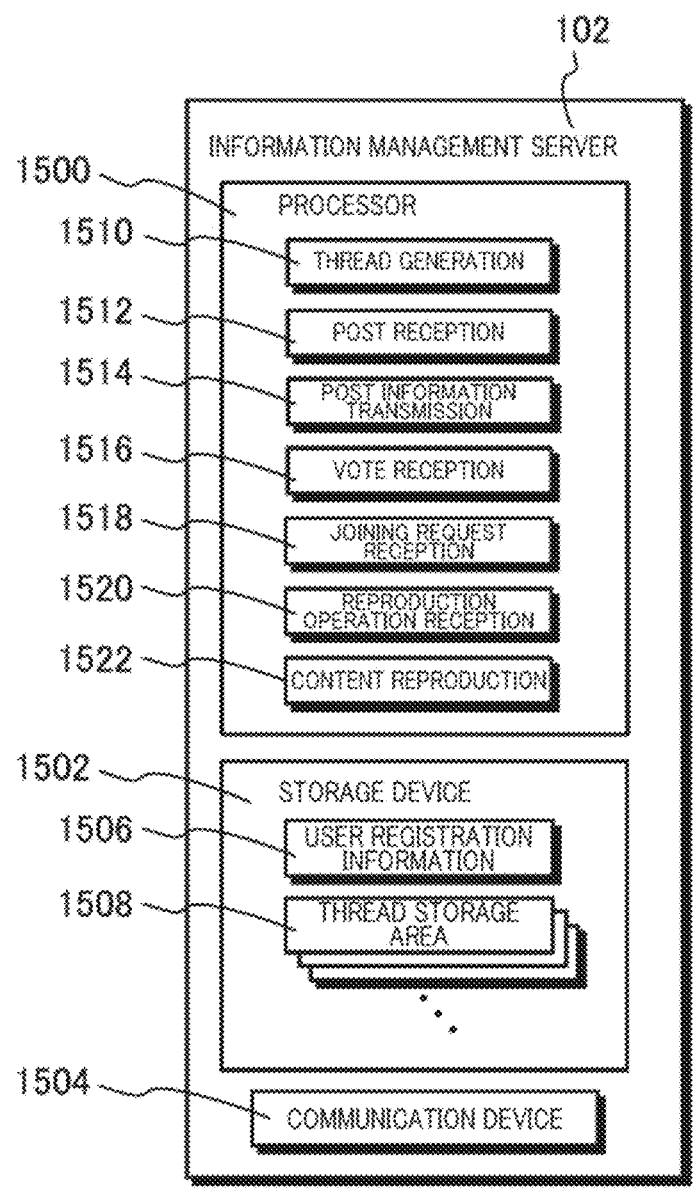
FIG. 15 is a diagram illustrating an example of the configuration of an information management server configuring the information sharing system illustrated in FIG. 1.

First, the configuration of the information management server 102 will be described. FIG. 15 is a diagram illustrating an example of the configuration of the information management server 102. The information management server 102 includes a processor 1500, a storage device 1502, and a communication device 1504. The storage device 1502 is configured by a volatile semiconductor memory and a nonvolatile semiconductor memory and/or a hard disk device (memory) for example, and includes user registration information 1506 and a thread storage area 1508. In addition, the storage device 1502 preserves other data and/or a program required for the operation of the processor 1500.

For the user registration information 1506, user information of each user 130 registered beforehand as a user of the information sharing system 100 is preserved. The user information includes the user identification information such as a user ID for identifying each user 130, and the access information and the mail address for communicating with the terminal device 110 of the user 130. In addition, the thread storage area 1508 is the storage area secured for each thread as an area to store the posts or the like to the created thread every time a thread generation unit 1510 to be described later receives the thread creation request from the terminal device 110 and creates the thread.

The communication device 1504 is a transmitter-receiver (circuit) which performs cable communication and/or wireless communication for connecting the processor 1500 and the terminal device 110 of the user 130 communicably via the communication network 104.

The processor 1500 is a computer including a processor such as a CPU (Central Processing Unit), for example. The processor 1500 may be configured to include a ROM (Read Only Memory) where the program is written and a RAM (Random Access Memory) for temporary storage of the data or the like. Then, the processor 1500 includes the thread generation unit 1510, a post reception unit 1512, a post information transmission unit 1514, a vote reception unit 1516, a joining request reception unit 1518, a reproduction operation reception unit 1520, and a content reproduction unit 1522, as functional elements or functional units.

The functional elements included in the processor 1500 are achieved by the processor 1500 which is the computer executing the program, for example. Note that the computer program can be stored in an arbitrary computer-readable storage medium. Instead, all or part of the functional elements included in the processor 1500 may be configured by hardware including one or more electronic circuit components respectively.

The thread generation unit 1510 generates the thread which is a virtual storage space to preserve the posts from users belonging to each user group, for each user group. Specifically, every time the thread creation request is received from the terminal device 110 of any user 130, the thread generation unit 1510 generates a new thread by newly securing the thread storage area 1508 of a predetermined size in the storage device 1502.

As described above, the thread creation request includes the thread name, the representative image, and the mail addresses of the selected invited users. The thread generation unit 1510 stores the thread information, the joined user list, the invited user information and the synchronous joined user list of the created thread in the thread storage area 1508 of the thread as the thread attribute information. As described above, the thread information includes the thread name and the representative image of the thread. In addition, the joined user list includes the user identification information of the creator of the thread. Further, the invited user information includes the user identification information of each invited user. Here, the thread generation unit 1510 can acquire the user identification information of the thread creator and the invited users by referring to the user registration information based on the access information of the terminal device 110 of the transmission source and the mail addresses of the invited users attached to the thread creation request. The synchronous joined user list is an empty list as default.

After generating the thread, the thread generation unit 1510 transmits the joined thread information for the user 130 who has transmitted the thread creation request to the terminal device 110 which is the transmission source of the thread creation request, and also transmits the invitation mail to the terminal device 110 of each invited user.

The joined thread information includes the thread names and the representative images of all the threads that the user 130 has joined. The thread generation unit 1510 refers to the joined user list preserved in the thread attribute information in all the thread storage areas 1508, specifies the thread attribute information in which the joined user list including the user identification information of the user 130 is preserved, and generates the joined thread information based on the thread information preserved in the specified thread attribute information. Also, when transmission of the joined thread information is requested from the terminal device 110 of any user 130, the thread generation unit 1510 transmits the joined thread information of the user 130 to the terminal device 110.

Further, when the joining response to the invitation mail is received from the terminal device 110 of the user 130 who is the invited user, the thread generation unit 1510 refers to the thread attribute information in the thread storage area 1508 of the corresponding thread, and moves the user identification information of the user 130 who is the transmission source of the joining response in the invited user information preserved in the thread attribute information to the joined user list preserved in the same thread attribute information.

Further, when the declining response to the invitation mail is received from the terminal device 110 of the user 130 who is the invited user, the thread generation unit 1510 refers to the thread attribute information in the thread storage area 1508 of the corresponding thread, and deletes the user identification information of the user 130 who is the transmission source of the declining response in the invited user information preserved in the thread attribute information.

According to the above, the thread generation unit 1510 generates the thread to preserve the posts from the joined users belonging to each user group, for each user group of the joined users configured by the user 130 who has created the thread and the users 130 that are the invited users who have accepted the invitation.

The post reception unit 1512 receives the post to the thread that the user 130 has joined from the terminal device 110 of the user 130 via the communication device 1504, and stores the post in the thread storage area 1508 of the thread secured in the storage device 1502. Specifically, the post reception unit 1512 receives post information which is the post to the thread from the terminal device 110 of the user 130. The post information includes the user identification information of the user 130, the thread name of the thread which is a posting object, post category information, and post content information. The post category information is the information indicating the category of the post such as the spot, the AV and the photograph, for example. In addition, the post content information includes the above-described POI information, the access information to the data for the reproduction of the music or the like, or the access information to the image data or the like of the photograph or the like, for example.

Every time the post information is received, the post reception unit 1512 generates a unique post identification ID, and also specifies the thread storage area 1508 of the corresponding thread from the thread name included in the post information. In addition, the post reception unit 1512 generates one post record configured by the post content information, the user identification information and the post category information included in the received post information, the vote number (an initial value is zero) acquired by the post, and the post identification information indicating the generated post identification ID. Then, the post reception unit 1512 preserves the generated post record in the specified thread storage area 1508.

The post information transmission unit 1514 receives a post list request from the terminal device 110 of the user 130. The post list request includes the user identification information of the user 130 who is the transmitter and the specifying of the thread name. As the post list request is received from the terminal device 110 of the user 130, the post information transmission unit 1514 refers to the joined user list preserved in the thread storage area 1508 of the thread corresponding to the thread name included in the post list request, and confirms that the user 130 who is the transmitter is the joined user of the thread.

When the user 130 who is the transmitter is the joined user of the thread, the post information transmission unit 1514 refers to all the post records preserved in the thread storage area 1508 of the thread, creates the post list information for the thread, and transmits the post list information to the terminal device 110 of the user 130. The post list information includes the post identification information of all the posts posted to the thread, and the post content information, the post category information and the acquired vote number of each post. Thus, the posts preserved in the thread storage area 1508 of the thread are displayed only at the terminal device 110 of the user 130 belonging to the user group of the joined users of the thread. The display of the posts is displayed as the thumbnails indicating the respective posts as described with reference to FIG. 8, FIG. 9 and FIG. 11.

The vote reception unit 1516 receives a vote from the user 130 to each post to the thread. Specifically, the vote reception unit 1516 receives voting information from the terminal device 110 of the user 130. The voting information includes the specifying of the thread name and the post identification information of the post which is a voting object. Then, the vote reception unit 1516 updates the vote number for the post by adding 1 to the vote number of the post record specified by the post identification information among the post records stored in the thread storage area 1508 specified by the thread name, based on the received voting information.

The joining request reception unit 1518 receives the joining request regarding the synchronous output for the content of the post, from the terminal device 110 of the user 130. The joining request includes the specifying of the thread name, and the user identification information of the user 130 who is the transmission source of the joining request. As the joining request is received from the terminal device 110 of the user 130, the joining request reception unit 1518 adds the user identification information of the user 130 to the synchronous joined user list preserved in the thread storage area 1508 of the thread specified by the thread name. Thus, the user 130 who has transmitted the joining request becomes the synchronous joined user.

In addition, when the user identification information of the user 130 is added to the synchronous joined user list, the joining request reception unit 1518 instructs the content reproduction unit 1522 to transmit synchronous reproduction information to the terminal device 110 of the user 130.

The reproduction operation reception unit 1520 receives the reproduction operation information regarding the content reproduction from the terminal device 110 of the user 130 who is the synchronous joined user. The reproduction operation information includes the user identification information of the user 130 who is the transmitter, the post identification information of the post which is the synchronous reproduction object, the information of the present reproduction part of the content of the post, and the content (the reproduction start, stop and temporary stop or the like, for example) of the reproduction operation.

The content reproduction unit 1522 makes the terminal devices 110 of all the users 130 (that is, all the users 130 who are the synchronous joined users) from whom the joining request is received synchronously output the content which is the object of the reproduction operation, based on the reproduction operation regarding the content in the terminal device 110 of any user 130 from whom the joining request is received. Here, the synchronous output is simultaneous reproduction and output of the same part of the identical content in all the terminal devices 110 to be the target. In the present embodiment, the synchronously outputted content is the music or the like, and the same melody part of the identical musical piece is simultaneously reproduced and outputted in all the terminal devices 110 to be the target by synchronous output.

Specifically, when the reproduction operation reception unit 1520 receives the reproduction operation information, the content reproduction unit 1522 transmits the synchronous reproduction instruction to the terminal devices 110 of all the users 130 who are the synchronous joined users based on the reproduction operation information. The synchronous reproduction instruction includes the post identification information of the post which is the synchronous reproduction object, the information of the present reproduction part of the content of the post, and the content (the reproduction start, stop and temporary stop or the like, for example) of the reproduction operation to be executed in the terminal devices 110.

By the instruction from the joining request reception unit 1518, the content reproduction unit 1522 transmits the synchronous reproduction information to the terminal device 110 of the instructed user 130. The synchronous reproduction information includes the post identification information of the post being synchronously reproduced at present, and the information of the present reproduction part of the content of the post.

Figure 16:
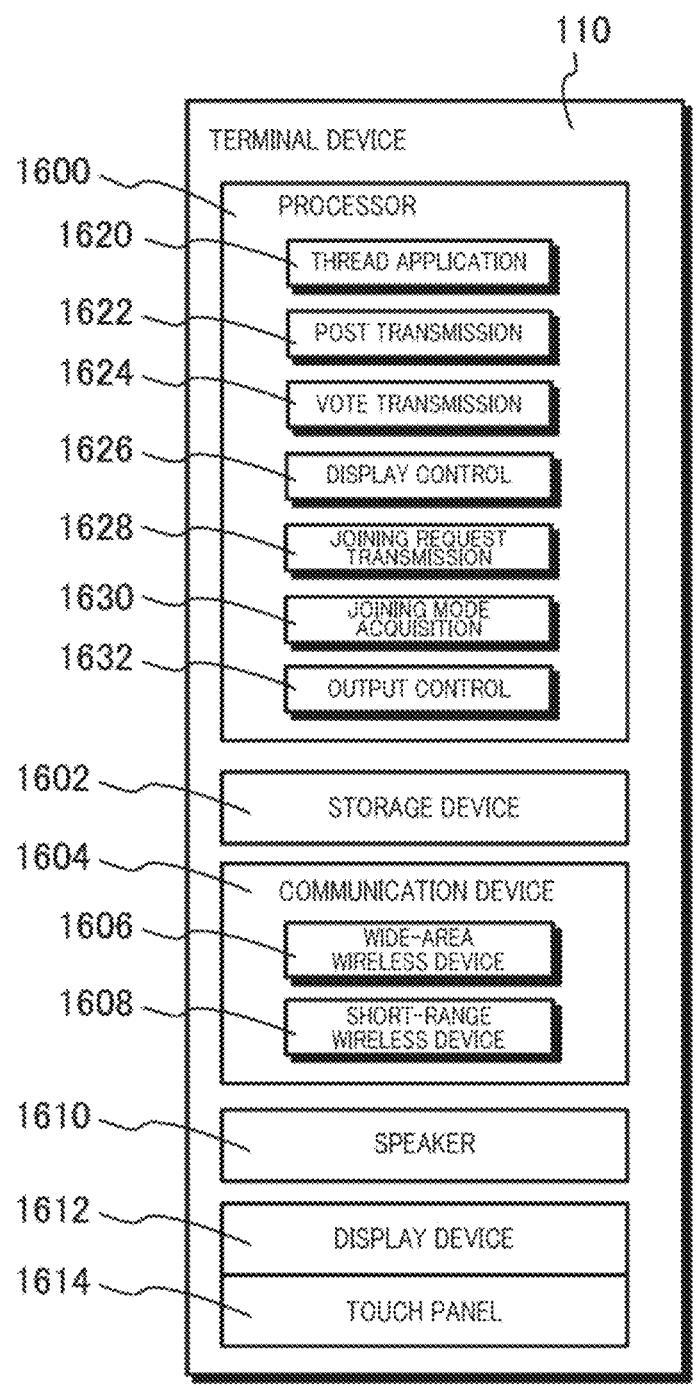
FIG. 16 is a diagram illustrating an example of the configuration of the terminal device configuring the information sharing system illustrated in FIG. 1.

Next, the configuration of the terminal device 110 configuring the information sharing system 100 will be described. FIG. 16 is a diagram illustrating an example of the configuration of the terminal device 110. The terminal device 110 includes a processor 1600, a storage device 1602, a communication device 1604, a speaker 1610, the display device 1612, and the touch panel 1614 provided on the display screen of the display device 1612. The display device 1612 is a liquid crystal display (LCD), for example.

The storage device 1602 is configured by a volatile semiconductor memory and a nonvolatile semiconductor memory and/or a hard disk device (memory) for example, and preserves the data and/or the program required for the operation of the processor 1600.

The communication device 1604 includes a wide-area wireless device 1606 and a short-range wireless device 1608. The short-range wireless device 1608 is a wireless communication device (transmitter/receiver, circuit) which communicates with an on-vehicle short-range wireless device or the like according to a Bluetooth communication standard, for example. In addition, the wide-area wireless device 1606 is a wireless communication device (transmitter/receiver, circuit) for communicating with the information management server 102 and the other terminal devices 110, for example, via the communication network 104.

The processor 1600 is a computer including a processor such as a CPU, for example. The processor 1600 may be configured to include a ROM where the program is written and a RAM for the temporary storage of the data or the like. Then, the processor 1600 includes a thread application unit 1620, a post transmission unit 1622, a vote transmission unit 1624, a display control unit 1626, a joining request transmission unit 1628, a joining mode acquisition unit 1630, and an output control unit 1632 as functional elements or functional units.

The functional elements included in the processor 1600 are achieved by the processor 1600, which is the computer, executing the program (including the joining application described above), for example. Note that the computer program can be stored in an arbitrary computer-readable storage medium. Instead, all or part of the functional elements included in the processor 1600 may be configured by hardware including one or more electronic circuit components respectively.

For example, in the operation described above with reference to FIG. 3-FIG. 5, when the user 130 operates the text section 510 where "setting" is written in the title display section 300 illustrated in FIG. 5, the thread application unit 1620 transmits the thread creation request to the information management server 102. As described above, the thread creation request includes the thread name and the representative image inputted by the user 130 on the screen illustrated in FIG. 5 and the mail addresses of the invited users selected by the user 130 on the screen illustrated in FIG. 4.

For example, when the user 130 performs posting to any thread by the operation described with reference to FIG. 8, FIG. 9 and FIG. 11, the post transmission unit 1622 transmits the post information indicating the post to the information management server 102. As described above, the post information includes the user identification information of the user 130 who has performed the posting, the thread name of the thread which is the posting object, the post category information, and the post content information.

For example, when the user 130 votes for any post by the operation described with reference to FIG. 8, FIG. 9 and FIG. 11, the vote transmission unit 1624 transmits the voting information for the vote to the information management server 102. As described above, the voting information includes the specifying of the thread name and the post identification information of the post which is the voting object.

The display control unit 1626 displays the screen illustrated in FIG. 3-FIG. 13 at the display device 1612, according to the operation of the user 130 using the touch panel 1614. When displaying the screen illustrated in FIG. 3-FIG. 14, the display control unit 1626 acquires the information to be needed from the information management server 102. For example, when displaying the thread list screen illustrated in FIG. 3 and FIG. 6, the display control unit 1626 acquires the joined thread information from the information management server 102. In addition, for example, when displaying the post screen in FIG. 8, FIG. 9 and FIG. 11, the display control unit 1626 transmits the post list request regarding the corresponding thread to the information management server 102, and acquires the post list information.

In particular, the display control unit 1626 displays the thumbnails indicating the respective posts at the display device 1612 on the post screen illustrated in FIG. 8, FIG. 9 and FIG. 11. In addition, the display control unit 1626 changes the display aspect of the thumbnails according to the number of votes given by the voting buttons 820, 920 or 1120 which are the so-called "like" buttons, for each thumbnail indicating the post based on voting result information received from the information management server 102. As illustrated in FIG. 8, FIG. 9 and FIG. 11, the change of the display aspect is the change of the size (more specifically, the display size at the display device 1612) of the thumbnail for example, in the present embodiment.

Regarding the thread for which the user 130 who is the owner of the terminal device 110 is the joined user, the joining request transmission unit 1628 transmits the joining request regarding the synchronous output of the content included in the post of the thread to the information management server 102. For example, when the user 130 operates the synchronous reproduction button 932 by the operation described with reference to FIG. 9 in the above description, regarding the "spring drive" thread, the joining request transmission unit 1628 transmits the joining request regarding the synchronous output of the music or the like which is the content included in the post indicated by the AV post box 910 illustrated in FIG. 9, to the information management server 102. As described above, the joining request includes the specifying of the thread name, and the user identification information of the user 130 who is the transmission source of the joining request. In addition, when the joining request is transmitted to the information management server 102, the joining request transmission unit 1628 instructs a shift to the synchronous reproduction mode to the output control unit 1632.

Further, when the joining end button 1206 is operated on the screen illustrated in FIG. 12-FIG. 14, the joining request transmission unit 1628 transmits the joining end request to the information management server 102, and instructs the output control unit 1632 to end the synchronous reproduction mode.

The joining mode acquisition unit 1630 acquires the specifying of the joining mode which is the operation mode of the terminal device 110 in the synchronous output of the content (that is, in the synchronous reproduction mode), from the user 130. Specifically, the joining mode acquisition unit 1630 acquires the specifying of the joining mode from the user 130 by detecting the operation for the mode setting buttons 1200, 1202 and 1204 performed by the user 130 on the joining mode setting screen illustrated in FIG. 12.

In addition, when the specifying of the driver mode meaning joining the synchronous output as the driver user who is the driver of the vehicle 200 is acquired as the joining mode by detecting that the mode setting button 1200 is touched, the joining mode acquisition unit 1630 establishes the communication between the terminal device 110 and on-vehicle equipment of the vehicle 200 by the short-range wireless device 1608. Then, by instructing the operation in the driver mode to the output control unit 1632, the joining mode acquisition unit 1630 outputs the content of the post from the terminal device 110 to the on-vehicle equipment of the vehicle 200, an on-vehicle speaker 1714 (to be described later) for example.

Further, when the specifying of the passenger mode meaning joining the synchronous output as the passenger user who is the passenger of the vehicle 200 is acquired as the joining mode by detecting that the mode setting button 1202 is touched, the joining mode acquisition unit 1630 instructs the operation in the passenger mode to the output control unit 1632. Thus, the joining mode acquisition unit 1630 makes the output control unit 1632 set the output operation from the speaker 1610 to the mute state, and inhibits the output of the content from the terminal device 110 at least for the sound.

Further, when the specifying of the vehicle outside mode is acquired as the joining mode by detecting that the mode setting button 1204 is touched, the joining mode acquisition unit 1630 instructs the output control unit 1632 the operation in the vehicle outside mode.

According to the reproduction operation regarding the content of the post given by the reproduction button 940 or the like illustrated in FIG. 9 or FIG. 10, the output control unit 1632 reproduces the content of the post, and output the content using the speaker 1610 and/or the display device 1612. Hereinafter, the operation is referred to as a normal operation mode.

In addition, when the shift to the synchronous reproduction mode is instructed from the joining request transmission unit 1628, the output control unit 1632 starts the operation in the synchronous reproduction mode. In the synchronous reproduction mode, the output control unit 1632 sends the reproduction operation information regarding the content reproduction operation acquired from the reproduction button 940 or the like to the information management server 102. Further, when the synchronous reproduction information is received from the information management server 102, the output control unit 1632 reproduces the content of the post indicated by the synchronous reproduction information from the present reproduction part indicated by the synchronous reproduction information. Also, when the synchronous reproduction instruction is received from the information management server 102, the output control unit 1632 executes the operation (the reproduction start and stop or the like, for example) corresponding to the reproduction operation indicated by the synchronous reproduction instruction.

In addition, when the operation in the driver mode is instructed from the joining mode acquisition unit 1630 in the synchronous reproduction mode, the output control unit 1632 outputs the reproduced content to the on-vehicle equipment of the vehicle 200, the on-vehicle speaker 1714 for example, via the short-range wireless device 1608.

Further, when the operation in the passenger mode is instructed from the joining mode acquisition unit 1630 in the synchronous reproduction mode, the output control unit 1632 sets the output operation from the speaker 1610 to the mute state, and stops the output of the content from the speaker 1610.

Also, when the operation in the vehicle outside mode is instructed from the joining mode acquisition unit 1630 in the synchronous reproduction mode, the output control unit 1632 outputs the reproduced content using the speaker 1610.

Further, when the end of the synchronous reproduction mode is instructed from the joining request transmission unit 1628, the output control unit 1632 ends the operation in the synchronous reproduction mode, and returns to the normal operation mode.

Next, the configuration of the vehicle 200 which reproduces the content of the music or the like in cooperation with the terminal device 110 configuring the information sharing system 100 will be described.

Figure 17:
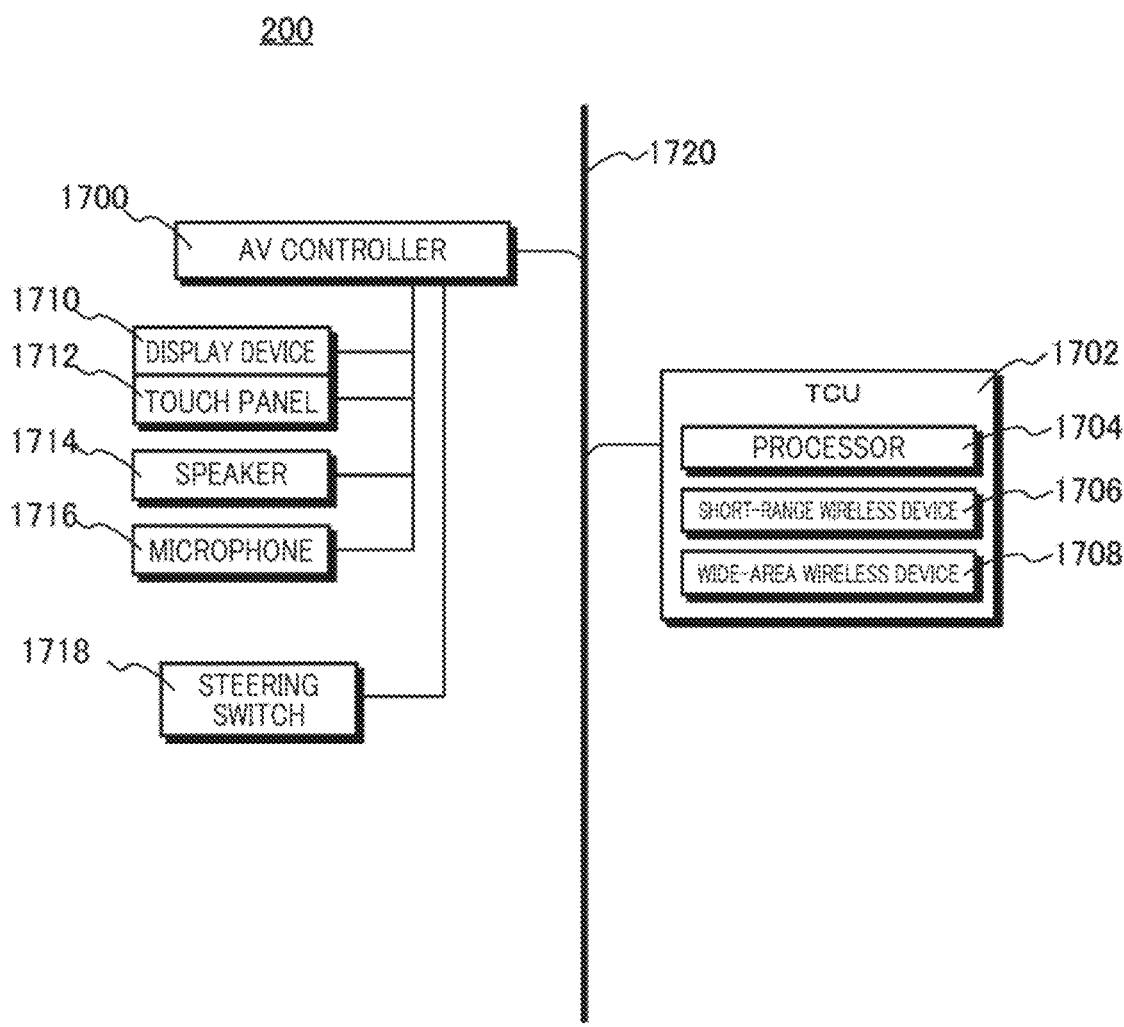
FIG. 17 is a diagram illustrating an example of the configuration of a vehicle cooperating with the information sharing system illustrated in FIG. 1.

FIG. 17 is a diagram illustrating an example of the configuration of the vehicle 200. The vehicle 200 includes an AV (Audio Visual) controller 1700 which is an on-vehicle electronic control unit (ECU, Electronic Control Unit), and a TCU (Telematics Control Unit) 1702. In addition, the AV controller 1700 and the TCU 1702 are connected communicably with each other via an on-vehicle network bus 1720. The on-vehicle network bus 1720 is a CAN (Control Area Network) bus which performs the communication according to a CAN communication standard, for example.

The TCU 1702 includes a short-range wireless device 1706, a wide-area wireless device 1708, and a processor 1704 which controls the operation of the communication devices. The processor 1704 is a computer including a processor such as a CPU, for example. The short-range wireless device 1706 is a wireless communication device which communicates with the terminal device 110 according to the Bluetooth communication standard, for example. In addition, the wide-area wireless device 1708 is a wireless communication device for communicating with the information management server 102 and other servers or the like which provide music or distribute moving images, for example, via the communication network 104.

The AV controller 1700 includes a processor (not illustrated) such as a CPU, controls the operation of a display device 1710 which is a liquid crystal display for example and the speaker 1714 provided inside the compartment of the vehicle 200, displays the images at the display device 1710, and outputs the sound from the speaker 1714. In addition, the AV controller 1700 acquires input from a touch panel 1712 provided on the display screen of the display device 1710 and a steering switch 1718 provided on the steering wheel of the vehicle 200.

In particular, the AV controller 1700 receives content reproduction output from the terminal device 110 via the short-range wireless device 1706, and outputs the received content reproduction output to the display device 1710 and/or the speaker 1714, for example.

Figure 18:
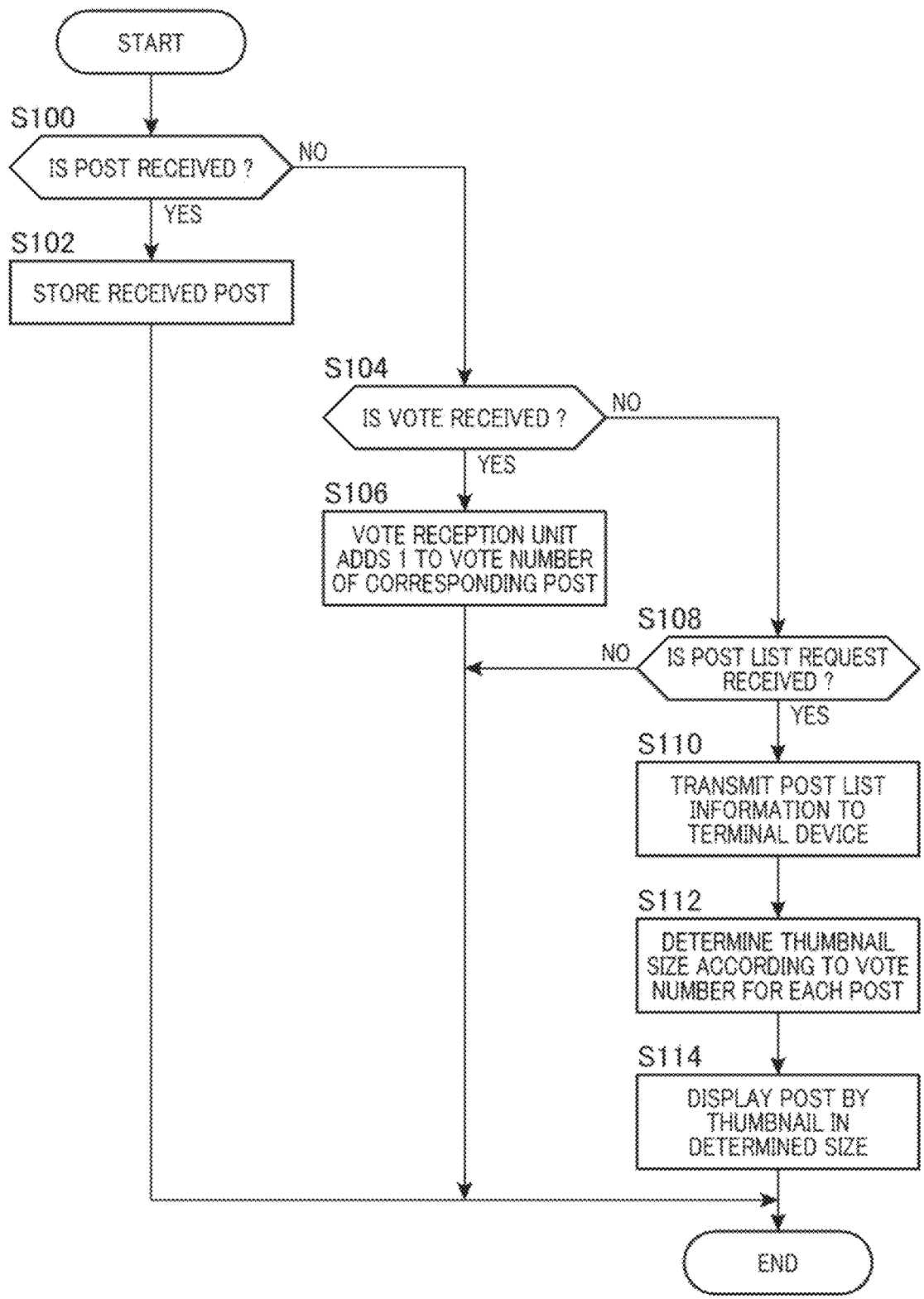
FIG. 18 is a flowchart illustrating a procedure of post display processing of the information sharing system illustrated in FIG. 1.

Next, the operation of the information sharing system 100 will be described with reference to flowcharts illustrated in FIG. 18 and FIG. 19. FIG. 18 and FIG. 19 are the flowcharts illustrating procedures of post display processing and synchronous reproduction processing in the information sharing system 100, respectively.

First, the post display processing illustrated in FIG. 18 will be described. The post display processing is the processing of receiving the post from the user 130 to the thread and displaying the post at the terminal device 110.

The information management server 102 acquires the post and the vote from the terminal device 110 as the post information and the voting information. The present processing is started when the information management server 102 receives some request, information or data from one of the terminal devices 110.

In FIG. 18, when the processing is started, first, the post reception unit 1512 of the information management server 102 determines whether or not the post information is received (S100). Then, when the post information is received (S100, YES), the post reception unit 1512 stores a new post record in the thread storage area 1508 of the corresponding thread based on the received post information (S102), and ends the present processing.

On the other hand, when the post information is not received in step S100 (S100, NO), the vote reception unit 1516 of the information management server 102 determines whether or not the voting information is received (S104). Then, when the voting information is received (S104, YES), 1 is added to the vote number of the post record stored in the corresponding thread storage area 1508 (S106), and the present processing is ended.

On the other hand, when the voting information is not received in step S104 (S104, NO), the post information transmission unit 1514 of the information management server 102 determines whether or not the post list request is received from any terminal device 110 (S108). Then, when the post list request is received (S108, YES), the post information transmission unit 1514 transmits the post list information for the thread requested by the post list request to the terminal device 110 which is the transmission source of the post list request (S110).

Next, the display control unit 1626 of the terminal device 110 which receives the post list information determines a thumbnail size according to the vote number for each post, for each post included in the post list information (S112). Then, the display control unit 1626 displays each post at the display device 1612 in the thumbnail format using the determined thumbnail size (S114), and ends the present processing. Here, the display of the post may be displayed at the display device 1612 for each category of the post as described above with the reference to FIG. 8, FIG. 9 and FIG. 11.

On the other hand, when the post list request is not received in step S108 (S108, NO), the post information transmission unit 1514 ends the present processing.

Next, the synchronous reproduction processing illustrated in FIG. 19 will be described. The synchronous reproduction processing is the processing of receiving the joining request from the terminal device 110, creating the synchronous joined user list and synchronously reproducing the content in the terminal devices 110 of all the synchronous joined users. The present processing is started when the information management server 102 receives some request, information or data from one of the terminal devices 110.

In FIG. 19, when the processing is started, first, the joining request reception unit 1518 of the information management server 102 of the information sharing system 100 determines whether or not the joining request is received from the terminal device 110 of any user 130 (S200). Then, when the joining request is received (S200, YES), the joining request reception unit 1518 preserves the user identification information of the user 130 who has transmitted the joining request in the synchronous joined user list stored in the thread storage area 1508 of the corresponding thread based on the received joining request (S210). In addition, the joining request reception unit 1518 instructs the content reproduction unit 1522 to transmit the synchronous reproduction information to the terminal device 110 of the user 130 who has transmitted the joining request (S212) and returns the processing to step S200. Here, the terminal device 110 which has transmitted the joining request shifts to the synchronous reproduction mode, receives the synchronous reproduction information, and reproduces the content being synchronously reproduced at present from the present reproduction part.

When the joining request is not received in step S200 (S200, NO), the reproduction operation reception unit 1520 determines whether or not the reproduction operation information is received from the terminal device 110 of any user 130 (S202). Then, when the reproduction operation information is received (S202, YES), the content reproduction unit 1522 synchronizes the reproduction operation of the content of the corresponding post in the terminal devices 110 of all the synchronous joined users based on the received reproduction operation information (S214), and returns the processing to step S200. Specifically, as described above, the content reproduction unit 1522 synchronizes the reproduction operation by transmitting the synchronous reproduction instruction to the terminal devices 110 of all the synchronous joined users based on the received reproduction operation information.

On the other hand, when the reproduction operation information is not received in step S202 (S202, NO), the joining request reception unit 1518 determines whether or not the joining end request is received from the terminal device 110 of any synchronous joined user (S204). Then, when the joining end request is received (S204, YES), the joining request reception unit 1518 deletes the user identification information of the joined user who has transmitted the joining end request from the synchronous joined user list of the corresponding thread (S206).

Next, the joining request reception unit 1518 determines whether or not the synchronous joined user list has become empty (that is, whether or not there is no more synchronous joined user) (S208). Then, when the synchronous joined user list has become empty (S208, YES), the joining request reception unit 1518 ends the present processing.

On the other hand, when the joining end request is not received in step S204 (S204, NO) and when the synchronous joined user list has not become empty in step S208 (S208, NO), the joining request reception unit 1518 returns the processing to step S200.

Note that the present invention is not limited to the configuration of the above-described embodiment, and can be implemented in various aspects without departing from the scope thereof.

For example, in the information sharing system 100 of the embodiment described above, the content of the post to the thread is POIs, music, moving images, still images such as photographs and video images, however, the content of the post is not limited thereto. The content of the post may be arbitrary information that can be shared among the plurality of users. Such content may be information configured by text or site information of a shop or tourist spot guide or the like, for example.

In addition, in the information sharing system 100, one voting button 820, 920 or 1120 which gives the affirmative evaluation is displayed in the post box indicating each post on the post screen illustrated in FIG. 8, FIG. 9 and FIG. 11, however, the voting buttons are not limited to the ones that give the affirmative evaluation equivalent to "like buttons". For example, each post box may be provided with a voting button that gives negative evaluation such as a so-called "dislike button" or may be provided with both of the voting button that gives the affirmative evaluation and the voting button that gives the negative evaluation.

In these cases, the display control unit 1626 of the terminal device 110 can change the display aspect of the thumbnail indicating each vote according to the number of the votes and the content (whether it is the affirmative evaluation or the negative evaluation) for each post. In addition, in the case where both of the voting button that gives the affirmative evaluation and the voting button that gives the negative evaluation are provided, the display control unit 1626 can change the display aspect of the thumbnail of the post, based on a final evaluation numerical value obtained by weight-subtracting the vote number by the voting button that gives the negative evaluation from the vote number by the voting button that gives the affirmative evaluation.

Further, in the information sharing system 100, the display aspect of the thumbnail to be changed according to the vote number is the size of the thumbnail, however, the display aspect to be changed is not limited thereto. The display aspect of the thumbnail to be changed according to the vote number may be an arbitrary aspect as long as a size relation of the affirmative or negative evaluation among the posts recognized by voting can be visually recognized. For example, the display control unit 1626 of the terminal device 110 may change the saturation, luminance, contour emphasis degree and/or contrast of the thumbnail according to the number of the votes, instead of the size of the thumbnail.

In addition, in the information sharing system 100, the content of the post to be synchronously reproduced is the music or the like, however, the content to be the object of the synchronous reproduction is not limited to the music or the like. The content to be the object may be arbitrary content as long as it is the content that can be included in the post and can be the object of the synchronous reproduction. For example, a plurality of posted photographs may be synchronously reproduced as slides, and the same photographs are displayed at the display devices 1612 of the terminal devices 110 of all the synchronous joined users.

Further, the content (the POI information, for example) of the post browsed at the display device 1612 of the terminal device 110 of one synchronous joined user may be simultaneously displayed at the terminal devices 110 of all the other synchronous joined users. Thus, the synchronous joined users can simultaneously change the destination and the place to stop by of the vehicles 200a and 200b, based on the simultaneously displayed POI information during a drive in the vehicles 200a and 200b, for example.

In addition, in the information sharing system 100, the driver mode, the passenger mode and the vehicle outside mode are present in the relation with the vehicle 200 as the joining mode in the synchronous reproduction mode, however, the joining mode is not limited thereto. The output destination of the content reproduction to external equipment is not limited to the speaker 1714 and/or the display device 1710 loaded on the vehicle 200, and may be arbitrary external equipment connectable with the terminal device 110 via short-range radio such as Bluetooth. Such external equipment may be, for example, a Bluetooth speaker or a television connectable via the short-range radio. In this case, for example, the driver mode, the passenger mode and the vehicle outside mode may be defined as an "external equipment output mode" of performing reproduction output from the terminal device 110 to the external equipment, a "mute mode" of setting a built-in speaker of the terminal device 110 to be mute, and a "built-in speaker mode" of using the speaker 1610 provided in the terminal device 110, respectively.

Also, in the information sharing system 100, the output control unit 1632 of the terminal device 110 transmits the information of the reproduction operation by the reproduction button 940 or the like displayed at the display device 1612 to the information management server 102 in the synchronous reproduction mode, however, acquisition means of the reproduction operation performed by the user 130 is not limited to the reproduction button 940 or the like. For example, the output control unit 1632 of the terminal device 110 may acquire the reproduction operation performed by the user 130 using the steering switch 1718 of the vehicle 200 via the short-range wireless device 1608 when the joining mode is set to the driver mode in the synchronous reproduction mode.

Further, the information sharing system 100 described above is configured by the information management server 102 illustrated in FIG. 15 and the plurality of terminal devices 110 illustrated in FIG. 16, however, the configuration of the information sharing system 100 is not limited thereto. For example, the components of the information management server 102 may be distributed and achieved by a plurality of servers connected via the communication network communicably to each other. In addition, some functional elements included in the processor 1500 of the information management server 102 may be achieved in the processor 1600 of the terminal device 110, or some functional elements included in the processor 1600 of the terminal device 110 may be achieved in the processor 1500 of the information management server 102 conversely.

As described above, the information sharing system 100 relating to the embodiment described above includes the post reception unit 1512 configured to receive and store the post from the user 130 configuring the user group of the joined users, and the content reproduction unit 1522 configured to output the content of the received post to the terminal device 110 of the user 130 of the user group. In addition, the information sharing system 100 includes the joining request reception unit 1518 configured to receive the joining request regarding the synchronous output of the content, from the user of the user group, and the joining mode acquisition unit 1630 configured to acquire the specifying of the joining mode which is the operation mode of the terminal device 110 in the synchronous output, from the user 130. Then, the content reproduction unit 1522 makes, based on the reproduction operation regarding the content in the terminal device 110 of any user 130 from whom the joining request is received, the terminal devices 110 of all the users 130 from whom the joining request is received synchronously output the content which is the object of the reproduction operation. Further, the joining mode acquisition unit 1630 establishes the communication between the terminal device 110 of the user 130 and the equipment of the vehicle 200 when the specifying of the driver mode meaning joining the synchronous output as the driver user who is the driver of the vehicle is acquired as the joining mode, instruct the output control unit 1632 and outputs the content from the terminal device 110 of the user 130 to the equipment of the vehicle 200.

According to the configuration, in the reproduction of the content of the music or the like based on the post from the user 130, sharing of the experience among the plurality of users 130 related to the content reproduction can be promoted and the oneness of the shared experience can be improved.

In addition, in the information sharing system 100, the joining mode acquisition unit 1630 instructs the output control unit 1632, and makes the terminal device 110 acquire the input from the steering switch 1718 provided on the steering wheel of the vehicle 200 as the reproduction operation regarding the content, when the specifying of the driver mode is acquired. According to the configuration, the user 130 who is the driver can easily perform the reproduction operation of the content at the time of the synchronous reproduction.

Further, in the information sharing system 100, the joining mode acquisition unit 1630 instructs the output control unit 1632, and inhibits the output of the content from the terminal device 110 of the user 130 when the specifying of the passenger mode meaning joining the synchronous output as the passenger user who is the passenger of the vehicle is acquired as the joining mode. According to the configuration, the output of the synchronously reproduced content being already outputted from the on-vehicle speaker 1714 by the driver mode and the output from the terminal device 110 of the user 130 who has newly joined the synchronous reproduction can be prevented from overlapping inside the compartment of the vehicle 200.

Also, in the information sharing system 100, the terminal device 110 of the user 130 whose joining request is not received by the joining request reception unit 1518 performs the reproduction operation of the content included in the post independent of the terminal devices 110 of the other users 130. According to the configuration, even the user 130 who does not join the synchronous reproduction operation can freely reproduce and enjoy the content of the post.

In addition, in the information sharing system 100, the content includes music, moving images, maps or photographs. According to the configuration, the content such as the music, the moving images, the places or the photographs that are easily connected with an action experience of travel can be shared among the users 130.

Further, the information sharing system 100 includes the thread generation unit 1510 configured to generate the thread which is the virtual storage space to preserve the posts from the users 130 belonging to the user group by the instruction from the user 130. The user group is the group of the joined users configured by a generation user who has instructed generation of the thread and the invited users invited to perform posting by the generation user. According to the configuration, the thread can be freely created for each specific theme for example, and the post for each theme can be shared among the users 130.

Also, the information sharing system 100 executes an information sharing method. The information sharing method includes a step (S100, S102) where the post reception unit 1512 receives and stores the post from the user configuring the user group, and a step (S214) where the content reproduction unit 1522 outputs the content of the received post to the terminal device 110 of the user 130 of the user group. In addition, the information sharing method includes a step (S200, S210) of receiving the joining request regarding the synchronous output of the content, from the user of the user group, and a step of acquiring the specifying of the joining mode which is the operation mode of the terminal device in the synchronous output, from the user by the joining mode acquisition unit 1630. Then, in the outputting step, the terminal devices of all the users 130 from whom the joining request is received are made to, based on the reproduction operation regarding the content in the terminal device 110 of any user 130 from whom the joining request is received, synchronously output the content which is the object of the reproduction operation (S214). Further, in the step of acquiring the specifying of the joining mode, the communication between the terminal device of the user and the equipment of the vehicle is established and the content is outputted from the terminal device of the user to the equipment of the vehicle when the specifying of the driver mode meaning joining the synchronous output as the driver user who is the driver of the vehicle is acquired as the joining mode (S214).

According to the configuration, in the reproduction of the content of the music or the like based on the post from the user 130, sharing of the experience among the plurality of users 130 related to the content reproduction can be promoted and the oneness of the shared experience can be improved.

100 . . . information sharing system, 102 . . . information management server, 104 . . . communication network, 110, 110a, 110b, 110c, 110d, 110e, 110f, 110g, 110h, 110i, 110j, 110k and 110m . . . terminal device, 130, 130a, 130b, 130c, 130d, 130e, 130f, 130g, 130h, 130i, 130j, 130k and 130m . . . user, 200, 200a and 200b . . . vehicle, 204, 210 . . . bike, 206 . . . house, 208 . . . train, 300 . . . title display section, 302 . . . main display section, 306, 830, 930 and 1130 . . . addition button, 310, 310a and 310b . . . thread box, 400 . . . user invitation box, 402, 510, 702 and 704 . . . text section, 500 . . . thread setting box, 502 . . . representative image section, 504 . . . thread name input section, 506 . . . invited user list, 508 . . . software keyboard, 700 . . . invitation display box, 800, 802 and 804 . . . category selection button, 810, 810a, 810b, 810c, 810d and 810e . . . spot post box, 820, 820a, 820b, 820c, 820d, 820e, 920, 920a, 920b, 920c, 920d, 920e, 1120, 1120a, 1120b, 1120c, 1120d, and 1120e, 1120f, 1120g, 1120h, 1120i, 1120j and 1120k voting button, 910, 910a, 910b, 910c, 910d and 910e . . . AV post box, 940 . . . reproduction button, 1000 . . . operation button set, 1002 . . . return button, 1004 . . . stop button, 1006 . . . temporary stop button, 1008 . . . feed button, 1110, 1110a, 1110b, 1110c, 1110d, 1110e, 1110f, 1110g, 1110h, 1110i, 1110j and 1110k . . . photograph post box, 1200, 1202 and 1204 . . . mode setting button, 1206 . . . joining end button, 1500, 1600 and 1704 . . . processor, 1502 and 1602 . . . storage device, 1504 and 1604 . . . communication device, 1506 . . . user registration information, 1508 . . . thread storage area, 1510 . . . thread generation unit, 1512 . . . post reception unit, 1514 . . . post information transmission unit, 1516 . . . vote reception unit, 1518 . . . joining request reception unit, 1520 . . . reproduction operation reception unit, 1522 . . . content reproduction unit, 1606 and 1708 . . . wide-area wireless device, 1608 and 1706 . . . short-range wireless device, 1610 and 1714 . . . speaker, 1612 and 1710 . . . display device, 1614 and 1712 . . . touch panel, 1620 . . . thread application unit, 1622 . . . post transmission unit, 1624 . . . vote transmission unit, 1626 . . . display control unit, 1628 . . . joining request transmission unit, 1630 . . . joining mode acquisition unit, 1632 . . . output control unit, 1700 . . . AV controller, 1702 . . . TCU, 1716 . . . microphone, 1718 . . . steering switch.

What is claimed is:

1. An information sharing system comprising a processor, wherein the processor:
   receives and stores, in a memory, posts from a plurality of users configuring a user group;
   outputs content of the received posts to respective terminal devices of the plurality of users of the user group;
   receives a joining request regarding synchronous output in which an identical content is synchronously played and output from the respective terminal devices of the plurality of users of the user group;
   acquires specification of a joining mode which is an operation mode of the respective terminal devices in the synchronous output, the specification of the joining mode being a selection of one of a driver mode for joining as a driver user in a vehicle, a passenger mode for joining as a passenger user in the vehicle, and an out-of-vehicle mode for joining as an out-of-vehicle user while at an outside of the vehicle;
   makes, based on a reproduction operation regarding the content in any of the respective terminal devices of the plurality of users from whom the joining request is received, the respective terminal devices of the plurality of users synchronously output the identical content which is an object of the reproduction operation, and
   establishes communication between a terminal device, of the respective terminal devices, of the driver user and equipment of the vehicle when the driver mode is specified, meaning joining the synchronous output as the driver user who is a driver of the vehicle, and outputs the identical content from the terminal device of the driver user to the equipment of the vehicle;
   when the passenger mode is specified, meaning joining the synchronous output as the passenger user, by a passenger who rides in the vehicle driven by the driver, output of the content from a terminal device, of the respective terminal devices, of the passenger user is inhibited and an operation including reproduction and temporary stop of the identical content being synchronously output is enabled, and the passenger user may start a new synchronous reproduction of a new content from the terminal device of the passenger user; and
   when the out-of-vehicle mode is specified, indicating participation in the synchronous output as the out-of-vehicle user, as the operation mode, the processor outputs the identical content from a terminal device, of the respective terminal devices, of the out-of-vehicle user.

2. The information sharing system according to claim 1, wherein the processor makes the terminal device of the driver user acquire input from a steering switch provided on a steering wheel of the vehicle as the reproduction operation regarding the identical content, when the specification of the driver mode is acquired.

3. The information sharing system according to claim 1, wherein a terminal device of a user whose joining request is not received performs the reproduction operation of the identical content included in the post independent of the respective terminal devices of the plurality of users of the user group.

4. The information sharing system according to claim 1, wherein the content includes music, moving images, maps or photographs.

5. The information sharing system according to claim 1, wherein the processor
   generates a thread which is a virtual storage space to preserve posts from the plurality of users belonging to the user group by an instruction from a generation user,
   wherein the user group is a group of joined users configured by the generation user who has instructed generation of the thread and invited the user group to perform posting by the generation user.

6. An information sharing method of performing, by a processor:
   a step of receiving and storing, in a memory, posts from a plurality of users configuring a user group;

a step of outputting content of the received posts to respective terminal devices of the plurality of users of the user group;

a step of receiving a joining request regarding synchronous output in which an identical content is synchronously played and output from the respective terminal devices of the plurality of users of the user group; and a step of acquiring specification of a joining mode which is an operation mode of the respective terminal devices in the synchronous output of the plurality of users, the specification of the joining mode being a selection of one of a driver mode which joins as a driver user in a vehicle, a passenger mode which joins as a passenger user in the vehicle, and an out-of-vehicle mode which joins as an out-of-vehicle user while at an outside of the vehicle, wherein, by the processor, the respective terminal devices of the plurality of users from whom the joining request is received are made to, based on a reproduction operation regarding the content in any of the respective terminal devices of the plurality of users from whom the joining request is received, synchronously output the identical content which is an object of the reproduction operation, in the outputting step, and communication between a terminal device, of the respective terminal devices, of the driver user and equipment of the vehicle is established and the identical content is outputted from the terminal device, of the respective terminal devices, of the driver user to the equipment of the vehicle when the specification of the driver mode, meaning joining the synchronous output as the driver user who is a driver of the vehicle, is acquired as the joining mode in the acquiring step; and in the step of acquiring specification of the joining mode from the plurality of users, when the specification of the passenger mode, meaning joining the synchronous output as the passenger user who is a passenger of the vehicle, is acquired by the passenger who rides in the vehicle driven by the driver who acquired the specification of the driver mode, output of the content from a terminal device, of the respective terminal devices, of the passenger user is inhibited and an operation including reproduction and temporary stop of the identical content being synchronously output is enabled, and the passenger user may start a new synchronous reproduction of a new content from the terminal device of the passenger user, and when the specification of the out-of-vehicle mode, indicating participation in the synchronous output as an out-of-vehicle user, is acquired as the operation mode, the identical content is output from a terminal device, of the respective terminal devices, of the out-of-vehicle user.

* * * * *